US009865998B1

(12) United States Patent
Emert et al.

(10) Patent No.: US 9,865,998 B1
(45) Date of Patent: Jan. 9, 2018

(54) ELECTRICAL BUS INTERLACED TECHNIQUE FOR A SHARED RESOURCE DISTRIBUTED ELECTRICAL POWER DISTRIBUTION SYSTEM

(71) Applicant: Rosendin Electric, Inc., San Jose, CA (US)

(72) Inventors: Steven Emert, Hayward, CA (US); William Paul Mazzetti, Jr., San Francisco, CA (US)

(73) Assignee: Rosendin Electric, Inc, San Jose, CA (US)

( * ) Notice: Subject to any disclaimer, the term of this patent is extended or adjusted under 35 U.S.C. 154(b) by 419 days.

(21) Appl. No.: 14/712,817

(22) Filed: May 14, 2015

Related U.S. Application Data

(60) Provisional application No. 62/036,875, filed on Aug. 13, 2014, provisional application No. 62/076,346, filed on Nov. 6, 2014.

(51) Int. Cl.
| | |
|---|---|
| H02J 9/04 | (2006.01) |
| H02B 13/00 | (2006.01) |
| H02J 9/06 | (2006.01) |
| G05B 19/05 | (2006.01) |
| H02J 3/00 | (2006.01) |

(52) U.S. Cl.
CPC .......... H02B 13/005 (2013.01); G05B 19/05 (2013.01); H02J 3/00 (2013.01); H02J 9/061 (2013.01)

(58) Field of Classification Search
CPC .......... H02B 13/005; H02J 3/00; H02J 9/061; G05B 19/05
See application file for complete search history.

(56) References Cited

U.S. PATENT DOCUMENTS 5,672,920 A   9/1997  Donegan et al.
6,008,971 A * 12/1999  Duba ..................... H02H 7/30
                                            361/64

(Continued)

OTHER PUBLICATIONS

International Search Report and Written Opinion for International Application No. PCT/US2015/044812 dated Nov. 2, 2015, 26 pages, by the International Searching Authority, Alexandria, VA US.

*Primary Examiner* — Jared Fureman
*Assistant Examiner* — Michael Warmflash
(74) *Attorney, Agent, or Firm* — Rutan & Tucker, LLP

(57) ABSTRACT

A method, apparatus, and system are described for a radial bus Shared Resource Distributed electrical power Distribution System, which has multiple electrical power distribution platforms and a radial power distribution bus. The multiple electrical power distribution platforms are coupled to the radial bus in an interlaced fashion to supply AC electrical power to the downstream electrical loads. The electrical loads are dual corded and are configured to nominally receive AC electrical power from two separate power distribution platforms. A first power distribution platform electrically connects to a first set of the dual corded electrical loads. Also, the first power distribution platform electrically connects to a second set of the dual corded electrical loads. A second power distribution platform electrically connects to the first set of the dual corded electrical loads, and the second power distribution platform electrically connects to a third set of the dual corded electrical loads.

21 Claims, 13 Drawing Sheets

(56) References Cited

U.S. PATENT DOCUMENTS

| | | |
|---|---|---|
| 8,681,479 B2 | 3/2014 | Englert et al. |
| 2010/0102633 A1* | 4/2010 | Seaton .................... H02J 9/06 |
| | | 307/64 |
| 2011/0084672 A1 | 4/2011 | La Buschagne et al. |
| 2012/0326504 A1 | 12/2012 | Ballantine et al. |
| 2013/0293017 A1* | 11/2013 | Englert .................... H02J 9/04 |
| | | 307/65 |
| 2014/0098470 A1* | 4/2014 | Robinson ................ H02B 1/04 |
| | | 361/644 |

* cited by examiner

ELECTRICAL BUS INTERLACED TECHNIQUE FOR A SHARED RESOURCE DISTRIBUTED ELECTRICAL POWER DISTRIBUTION SYSTEM

RELATED APPLICATIONS

This application claims the benefit of U.S. Provisional Patent Application No. 62/036,875, filed Aug. 13, 2014, and entitled "SHARED RESOURCE SYSTEM" and U.S. Provisional Patent Application No. 62/076,346, filed Nov. 6, 2014, and entitled "SHARED RESOURCE DISTRIBUTED DISTRIBUTION SYSTEM (SRDDS)", and are herein incorporated in by reference.

FIELD

Some embodiments of the design generally relate to Electrical Power Distribution and more particularly to a modular platform.

BACKGROUND

Construction projects can take a large number of electrical components, each with a large current carrying capacity, in order to distribute AC electrical power in a Mission Critical Facility. However, some electrical components may not be needed at the beginning and can be added later.

SUMMARY

A radial bus Shared Resource Distributed electrical power Distribution System (SRDDS) is described. The radial bus SRDDS has multiple electrical power distribution platforms including a first electrical power distribution platform and a second electrical power distribution platform, and a radial power distribution bus to distribute AC electrical power to downstream electrical loads. The multiple electrical power distribution platforms are coupled to the radial power distribution bus in an interlaced fashion via two or more cross ties to supply AC electrical power to the downstream electrical loads. The downstream electrical loads are dual corded and are configured to nominally receive AC electrical power from two separate AC electrical power distribution platforms. The first electrical power distribution platform includes a first switchboard cabinet with two or more circuit breakers. The first electrical power distribution platform, via a first circuit breaker in the first switchboard cabinet, electrically connects to a first cross tie that then electrically connects to a first set of the dual corded electrical loads. The first electrical power distribution platform, via a second circuit breaker in the first switchboard cabinet, electrically connects to a second cross tie that then electrically connects to a second set of the dual corded electrical loads. The second electrical power distribution platform includes a second switchboard cabinet with two or more circuit breakers. The second electrical power distribution platform, via a third circuit breaker in the second switchboard cabinet, electrically connects to a third cross tie that then electrically connects to the first set of the dual corded electrical loads. The second electrical power distribution platform, via a fourth circuit breaker in the second switchboard cabinet electrically connects to a fourth cross tie that then electrically connects to a third set of the dual corded electrical loads.

A method of operating a radial bus Shared Resource Distributed electrical power Distribution System (SRDDS) is described. The method includes coupling multiple electrical power distribution platforms through a radial power distribution bus in an interlaced fashion, and supplying AC electrical power to downstream dual corded electrical loads. The method also includes coupling a first circuit breaker of a first switchboard cabinet of a first electrical power distribution platform through a first cross tie to a first set of the dual corded electrical loads, coupling a second circuit breaker of the first switchboard cabinet of the first electrical power distribution platform through a second cross tie to a second set of the dual corded electrical loads, and coupling a third circuit breaker of a second switchboard cabinet of a second electrical power distribution platform through a third cross tie to the first set of the dual corded electrical loads. The first set of the dual corded electrical loads potentially receive AC electrical power from both the first electrical power distribution platform and the second electrical power distribution platform.

BRIEF DESCRIPTION OF THE DRAWINGS

The accompanying drawings, wherein like parts are identified by like reference characters, are incorporated in and constitute a part of the specification. In the accompanying drawings, dashed lines are used to represent control connections.

Figure 1:
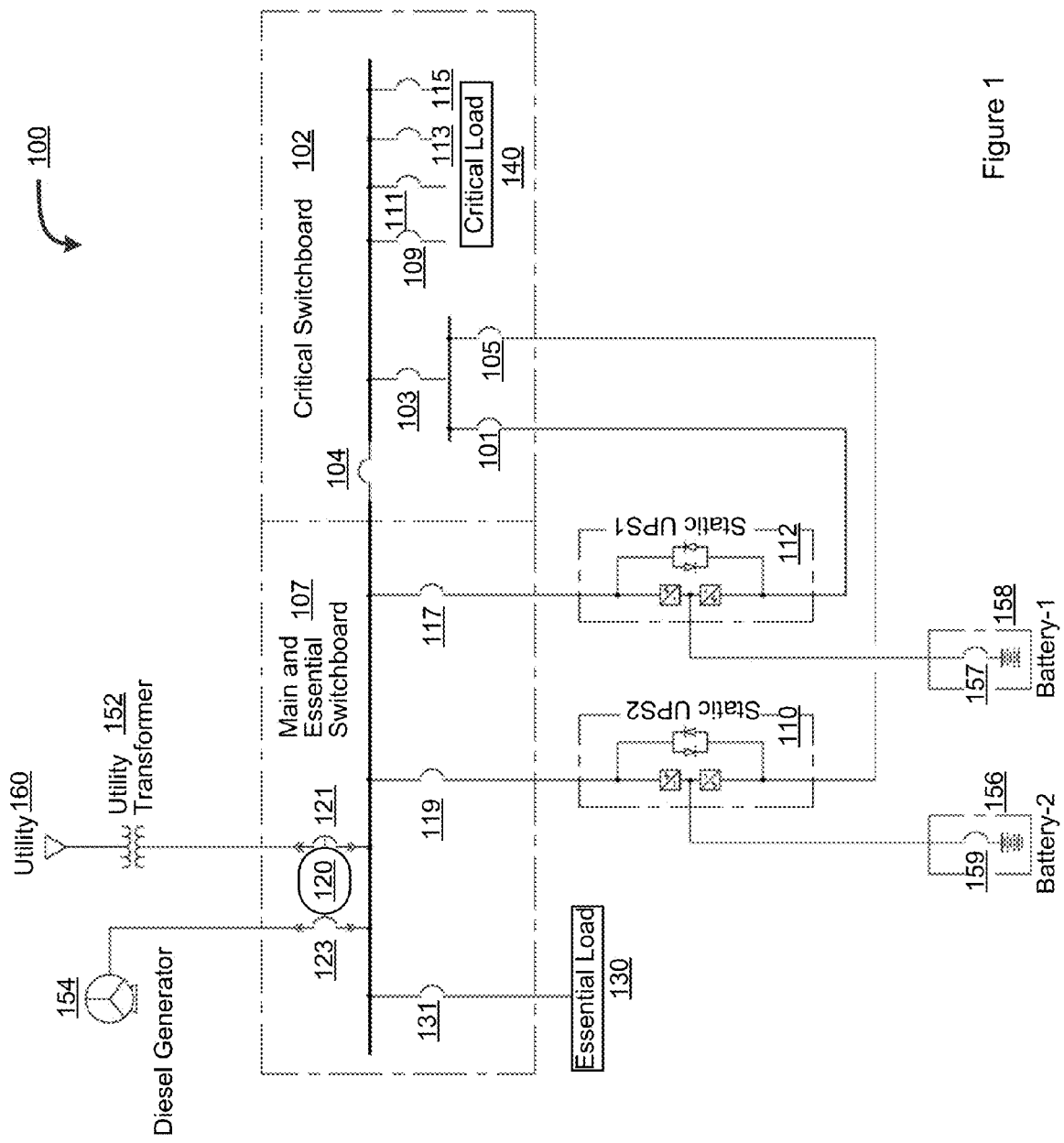
FIG. 1 is a single line diagram of a single power distribution platform. Multiple power distribution platforms can interconnect a radial bus.

While the design is subject to various modifications and alternative forms, specific embodiments thereof have been shown by way of example in the drawings and will herein be described in detail. The design should be understood to not be limited to the particular forms disclosed. It will be apparent to those skilled in the art of UPS design and applications that modifications and variations of this invention can be made without departing from the scope thereof. Therefore, it is intended that the present invention described herein cover all modifications and variations of this invention falling within the scope of the claimed characteristics and features and their equivalents.

DETAILED DISCUSSION

In the following description, numerous specific details are set forth, such as examples of specific data signals, named components, connections, amount of distribution buses, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further specific numeric references such as first switchboard cabinet, may be made. However, the specific numeric reference should not be interpreted as a literal sequential order but rather interpreted that the first switchboard cabinet is different than a second switchboard cabinet. Thus, the specific details set forth are merely exemplary. The specific details may be varied from and still be contemplated to be within the scope of the present design. The term coupled is defined as meaning connected either directly to the component or indirectly to the component through another component. Additionally, features in one embodiment may be implemented in another embodiment, where logically possible. Therefore, it is intended that the present invention described herein covers all modifications and variations of this invention falling within the scope of the claimed characteristics and features and their equivalents. Many example embodiments will be discussed below.

In general, disclosed herein are various methods and apparatuses associated with a radial bus Shared Resource Distributed electrical power Distribution System (SRDDS) to distribute power to critical as well as essential loads. The radial bus SRDDS is at least one radial bus electrical power distribution system in which power from the radial bus is shared by multiple electrical power users (loads) and power supplied to the radial bus is provided by switchboard cabinets of the multiple electrical power distribution platforms. The multiple electrical power distribution platforms are coupled to the radial bus in an interlaced fashion to supply AC electrical power to the downstream electrical loads. The electrical loads are dual corded and are configured to nominally receive AC electrical power from two separate power distribution platforms such that a first power distribution platform electrically connects to a first cord of a first set of the dual corded electrical loads and a second power distribution platform electrically connects to a second cord of the first set of the dual corded electrical loads.

DEFINITION OF TERMS

The following terms used consistently throughout this specification are defined below:

1. Static UPS: UPS shall denote a battery backed up uninterruptable power system. The term static is used to differentiate this type of UPS from those that deploy a rotating mass.
2. "Critical Loads" or "No-Break Loads": refers to electrical equipment that requires continuous conditioned electrical power. Typically critical equipment requires manual intervention to re-start after a power outage.
3. "Essential Loads" or "Short-Break Loads": refers to equipment that can sustain a momentary power outage. Typically essential equipment does not require manual intervention to re-start after a power outage.
4. "By-Pass": shall denote an alternative power path. The bypass path can be either automatically or manually switched in to replace a primary power path. The bypass power paths can be used when the primary power path fails or need to be shut down for service or maintenance.
5. Diesel Generator: is the combination of a diesel engine with an electric generator (often an alternator) to generate electrical energy. This is a specific case of engine-generator. The Diesel Generator, and/or another similar power source, can and may be an alternate source of AC power for the shared resource system from the one or more connections to the Utility Power grid. While this application notes the alternate source of power to the Utility input is a diesel engine-generator, the shared resource system may have an alternate power input from another AC power source such as a Utility, campus power system, fuel cell, or other AC power source. A diesel engine does not of course necessarily run on diesel oil as its fuel—the word diesel engine means compression-ignition, and tells us nothing about the fuel and it may run on gas.
6. Synchronization: is the process of matching the speed and frequency of a generator or other sources of power to a running network. An AC generator cannot deliver power to an electrical grid unless it is generating power at the same frequency as the network. If two segments of a grid are disconnected, they cannot exchange AC power again until they are brought back into exact synchronization.
7. CAN_BUS: is an ISO 11898 standard designed to allow microcontrollers and devices to communicate with each other within a vehicle without a host computer.
8. Static Switch: Switching of circuits by means of magnetic amplifiers, semiconductors, and other devices that have no moving parts.
9. Line reactor: are used to reduce short-circuit currents which result from line faults, plant expansions or power source additions, to levels that can be adequately handled by existing distribution equipment.

FIG. 1 is a single line diagram of a single power distribution platform. Multiple power distribution platforms can interconnect to a radial bus. The single line diagram 100 includes the utility service source 160, utility service transformer 152, diesel engine generator 154, main and essential switchboard 107, critical switchboard 102, static UPS1 112, static UPS2 110, circuit breaker 131 that couples the main and essential switchboard 107 to essential load connections 130, circuit breakers 109, 111, 113, and 115 that couple critical switchboard 102 to critical load connections 140. The electrical power distribution platform 100 also includes UPS1 batteries 158 and UPS2 batteries 156, coupled through circuit breakers 157 and 159 to the corresponding UPS units 112 and 110, a PLC controller 120, two electrically operated circuit breakers 121 and 123 that couple the main and essential switchboard 107 to utility transformer 152 and diesel generator 154. The UPS units are coupled through circuit breakers 101, 103, and 105 to the critical switchboard cabinet 102 to provide continuous conditioned electrical power to the critical switchboard cabinet. There is also a circuit breaker 104 between the critical switchboard cabinet 102 and the main and essential switchboard 107 that when circuit breaker 104 is closed AC electrical power can directly transfer from the main and essential switchboard 107 to the critical switchboard cabinet 102. Transfers between utility and diesel generator power are intended to be open (break before make) transfers. There can be multiple, such as four, power distribution platforms 100 in a typical distribution system. (See FIG. 5 for an example single line diagram with four power distribution platforms).

The individual power distribution modules (e.g., platforms) 100 may comprise of the following components:
1. One main switchboard.
2. Two static UPS modules 110 and 112.
3. One essential power distribution switchboard. The main switchboard and the critical switchboard can be combined into one single main and essential cabinet 107 of the power distribution platform 100.
4. One critical power distribution switchboard 102.
5. A PLC controls 120.

Each electrical power distribution platform includes at least one main switchboard cabinets, at least one essential switchboard cabinets, at least two static UPS units 110 and 112, at least one critical switchboard cabinets 102, and a Programmable Logic Controller (PLC) 120 to switch between sources of the AC power of the electrical power distribution platforms 100. Alternatively, a main switchboard cabinet and an essential switchboard cabinet can be combined into a main and essential switchboard cabinet 107. Each main switchboard cabinet can be coupled to both a dedicated diesel generator 154 and to AC utility grid 160. The main switchboard cabinet is also equipped with two transfer pair circuit breakers 121 and 123, which can be configured to transfer between the AC utility grid and the diesel generator, and also has two isolation circuit breakers 117 and 119 for connecting the AC electrical power to the UPS units 112 and 110. The two transfer pair circuit breakers 121 and 123 switch together, for example, when circuit breaker 123 opens, circuit breaker 121 closes and when circuit breaker 123 opens, circuit breaker 123 closes. In an example, e.g., FIGS. 1-3, the main switchboard cabinets and the essential switchboard cabinets can be combined into one 'main and essential' switchboard cabinet 107.

The critical loads require conditioned continuous AC electrical power and essential loads are configured to tolerate momentary power outage. The critical loads are coupled to the critical switchboards 102 through the critical load connections 140 or 145 and the essential loads are coupled to the essential switchboards, or alternatively to main and essential switchboard cabinet 107 through the essential load connections 130.

As discussed, one or more static uninterruptable power supply (UPS) units 110 or 112 can be coupled to each electrical power distribution platform 100. The UPS units can be configured to supply conditioned continuous power to the critical loads, which are the loads that cannot sustain power loss.

Each power distribution module 100 will be supplied by a dedicated utility transformer and a dedicated diesel generator. Utility power will be the primary source of power. The diesel generator will provide standby power.

The system may also have an automatic transfer switch, which has a controller (e.g., PLC 120) to switch between accepting an AC source of power from the backup diesel generator or the AC source power from the utility grid input and utility transformer.

UPS controls are located within each UPS. One UPS will become the master UPS with the other UPS slaving to the master. The UPS controls are tied together by the first communication network. The radial bus electrical power distribution platform uses static uninterruptible power supplies as opposed to rotary uninterruptible power supplies.

Each electrical power distribution module 100 can be supplied by a dedicated utility transformer and a dedicated diesel generator. Utility power will be the primary source of power. The diesel generator will provide standby power.

Faults on any component in an radial bus SRDDS to allow the remaining components to continue to operate. Any power distribution platform of the radial bus SRDDS can be de-energized and isolated for maintenance.

The subject design relates to electrical power distribution within a Mission Critical Facility such as a datacenter. The radial bus SRDDS uses dual conversion or static Uninterruptible Power Supplies (UPSs) to support the critical distribution bus. Diesel generators provide long term backup AC power for both the critical power and essential power distribution bus.

Mission Critical Facilities are defined as a facility with continuous operation requirements. Critical equipment is defined as equipment that requires a continuous or 'no-break' source power while in operation. Static UPSs are incorporated into the radial bus SRDDS design to provide continuous conditioned power to critical equipment to ensure continuous power is provided while in operation. Static UPSs use batteries to provide continuous power during a power outage rather than a rotating UPS such as flywheel or generator. They typically have between 1 to 15 minutes of battery backed up power. Critical equipment typically requires manual intervention to restart after a power outage. The Static UPSs do not need to have a choke directly connected to the output of each static UPS because by design the maximum fault current out of a static UPS can be 150% of its rating current output. The fault protection scheme of isolation breakers and differential current protection will adequately protect the electrical components in the distribution system for these types of overloads. However, the fault currents, such as 10,000 amps of fault current, from other AC power sources can be quite high and need choke/Line reactor interconnecting in between the AC power source and loads for fault current control.

Figure 2:
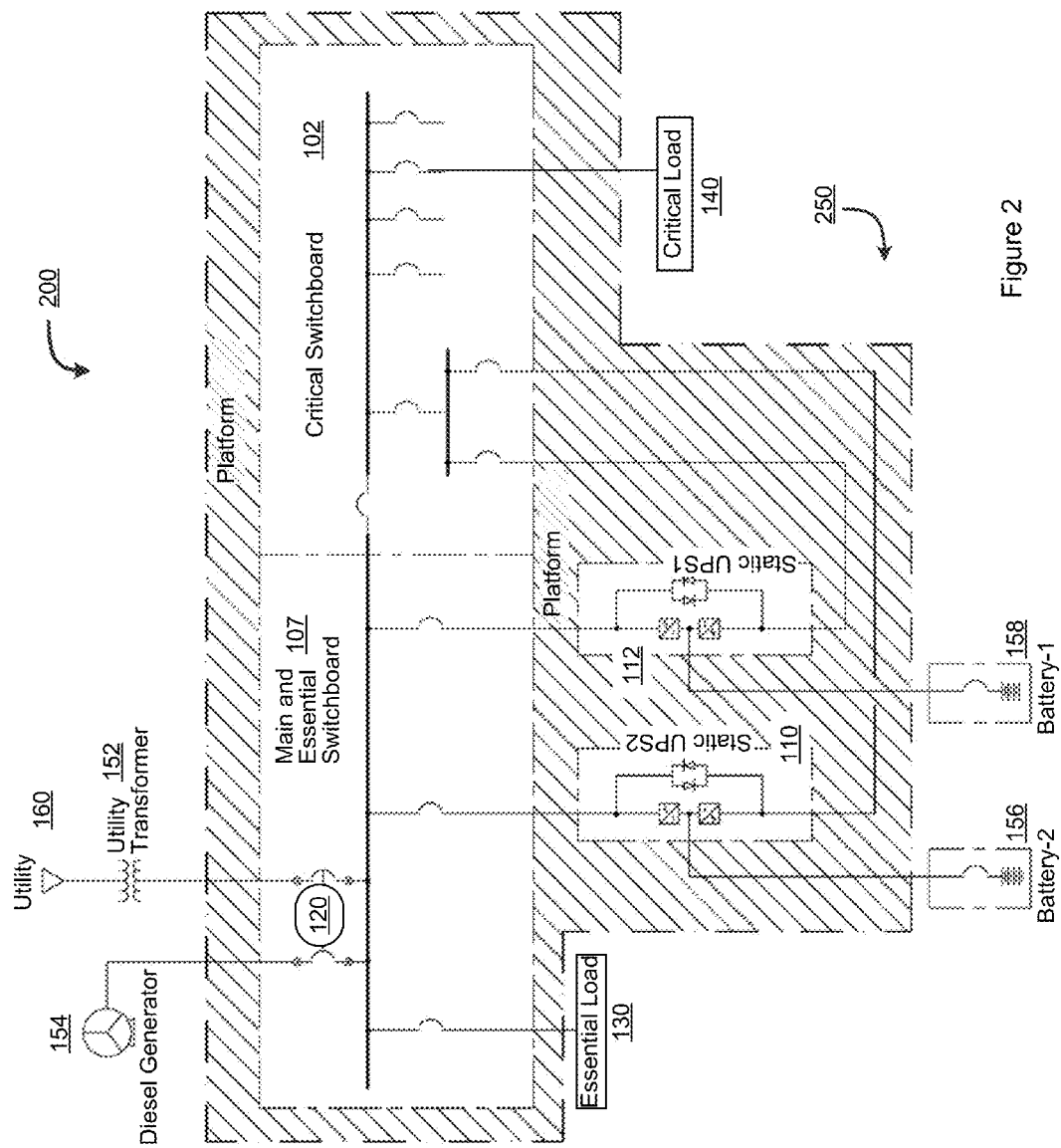
FIG. 2 is a single line diagram of showing a single power distribution platform with delineation of the equipment on the modular power center's platform and the equipment not on the modular power center's platform.

Additional isolation circuit breakers can be placed between the two critical power distribution switchboards of the electrical power distribution platforms 100. An isolation circuit breaker can be placed between the essential and main switchboards of the electrical power distribution platforms 100. The isolation circuit breakers are required to be able to completely de-energize the individual switchboards while maintaining power to the energized switchboards. The addition of isolation breakers from the AC power sources as well as isolation breakers between critical switchboards, allows any component to be completely shut down and de-energized without shutting down any of the critical load because of the additional isolation breakers added. Note, the FIGS. 1, 2, 3 show one load connection for each essential or critical switchboard, but in practice, many loads can be powered from a switchboard and thus many circuit breakers may branch off the switchboard to loads but merely one is shown. In fact FIG. 1 shows many circuit breaker but only one critical load connection 140. In practice, there can be many critical load connections 140 coupled to each critical switchboard cabinet 102. Note, the load current for all of those loads will merely total or be less than the rating of the one circuit breaker shown.

The main switchboard cabinet or alternatively the main and essential switchboard cabinet has a first dedicated connection to a diesel generator and a second dedicated connection to a utility AC grid, where the first connection can be through an amp incoming current (AIC) line reactor and the second connection can be through either of 1) an AIC line reactor, or 2) a high impedance transformer having an impedance greater than 5%, to limit a maximum amount of fault current that can be generated in the electrical power distribution platform 100. The maximum amount of fault current is generated during the time period before an overload protective component can actuate.

Each electrical power distribution platform can have more than one critical switchboard cabinets and the critical switchboard cabinets can connected 1) through one or more circuit breakers to one or more of the critical load connections (e.g., 140) to provide power to critical loads, and 2) through one or more circuit breakers to AC electrical power from one or more static UPS units to receive conditioned continuous power from the UPS units. The circuit breaker can be isolated circuit breakers.

Each electrical power distribution platform can have more than one essential switchboard cabinets that can be coupled in series through circuit breakers. The essential switchboard cabinets can be coupled through one or more circuit breakers to one or more essential loads. The circuit breakers are coupled to the essential loads through essential load connections 130.

When multiple electrical power distribution platforms are coupled to the same electrical loads, the UPS units act as effectively connected to the same input source and the same output distribution bus. The UPS units coupled to the same electrical loads communicate to ensure they are synchronized and properly aligned.

Essential equipment (essential loads) not backed up by UPS power can be subject to a 'short-break' power experience. Short-break refers to the time period the equipment is without power after an outage occurs. It specifically refers to the time it takes to start the generators then transfer load. Essential equipment loads typically does not require manual intervention and automatically restarts after a loss of power.

Equipment providing power are interlaced with equipment that requiring power.

Use of the radial bus SRDDS allows more than one electrical power distribution platform to connect electrical loads to provide fault redundant protection in case one or more of the electrical power distribution platforms losses power but the other electrical power distribution platforms connected to the radial bus ensure that all electrical loads continue to receive electrical power.

The radial bus SRDDS features multiple redundancies. The generators and distribution switchgear are N+1 redundant. The UPS units are configured as N+2 redundant. This redundancy scheme allows any single component to fail or be taken 'off-line' while the remaining components continue to operate. The individual static UPS modules must be able to support a total of two UPS modules connected in a parallel redundant configuration. In a parallel redundant UPS system all of the individual UPS modules must operate as a single UPS system. They must be able to fully synchronize and load share. There is no system cabinet in a parallel redundant system. Each UPS module must have an internal static bypass switch.

In accordance with one or more embodiments, a radial bus SRDDS provides redundancy and fault isolation. A system control cabinet may be used to support this configuration that has the following advantages.

1. The critical loads can be supported in increments based on actual demand.
2. A failure of any UPS unit or pair of UPS units will be supported by the remaining six UPS units. The UPS redundancy is eight to make six or N+2 redundant.
3. An electrical fault on any component is isolated allowing the remaining components of the radial bus SRDDS to continue to support the critical and essential equipment.
4. The critical load is supported by UPS power.
5. The critical load can be increased in an SRDDS by adding additional platforms.
6. The number of redundant component in the SRDDS configuration is flexible. The minimum number of the platforms is two.
7. Any component of the system may be taken out for maintenance without impacting the system's ability to support the critical load.
8. Individual systems may be removed from the radial bus SRDDS for service or maintenance without an impact to the critical load.

In accordance with one or more embodiments, the radial bus SRDDS, battery backed-up static UPS may be suitable for this application.

Each static UPS unit 112 or 110 is backed up by one or batteries 158 or 156 to provide battery backed up power to critical loads. The battery backed up power is provided when the electrical power distribution platforms switch from utility AC power to diesel generator AC power, thus supplying conditioned continuous AC electrical power without interruption.

FIG. 2 is a single line diagram of showing a single power distribution platform with delineation of the equipment on the modular power center's platform and the equipment not on the modular power center's platform. FIG. 2 shows diagram 200 which includes the shaded portion 250 showing the equipment on a modular electrical power distribution platform 100. Equipment on the modular electrical power distribution platform includes: main and essential switchboard 107, critical switchboard 102, static UPS-1 112, static UPS-2 110, and PLC controller 120. Equipment not on the electrical power distribution platform includes: utility service transformer 152, diesel engine generator 154, essential load equipment connection 130, critical load equipment connection 140, UPS1 batteries 158, UPS2 batteries 156. The modular power center platform framework ranges in height from 7 to 36 inches from its bottom and typically the components are mounted onto a top surface of the platform.

The Programmable Logic Controller (PLC) 120 of the main and essential switchboard cabinet 107 controls two transfer pair circuit breakers 121 and 123 located in the main and essential switchboard cabinet 107 to switch to either receive AC electrical power through the first dedicated connection from the diesel generator 154, or receive AC electrical power through the second dedicated connection from the utility grid 160. The utility grid 160 is coupled to the main and essential switchboard cabinet 107 through a utility transformer 152. At each point of time all electrical power distribution platforms are either coupled to the AC utility grid and receive AC electric power from the utility grid, or all are coupled to their respective diesel generators and receive AC electrical power from the diesel generators. In an example, the electrical power distribution platform 100 instead of the main and essential switchboard cabinet 107 can have two separate main switchboard cabinet and essential switchboard cabinet which are electrically coupled through circuit breakers, e.g., isolated circuit breakers.

Figure 3A:
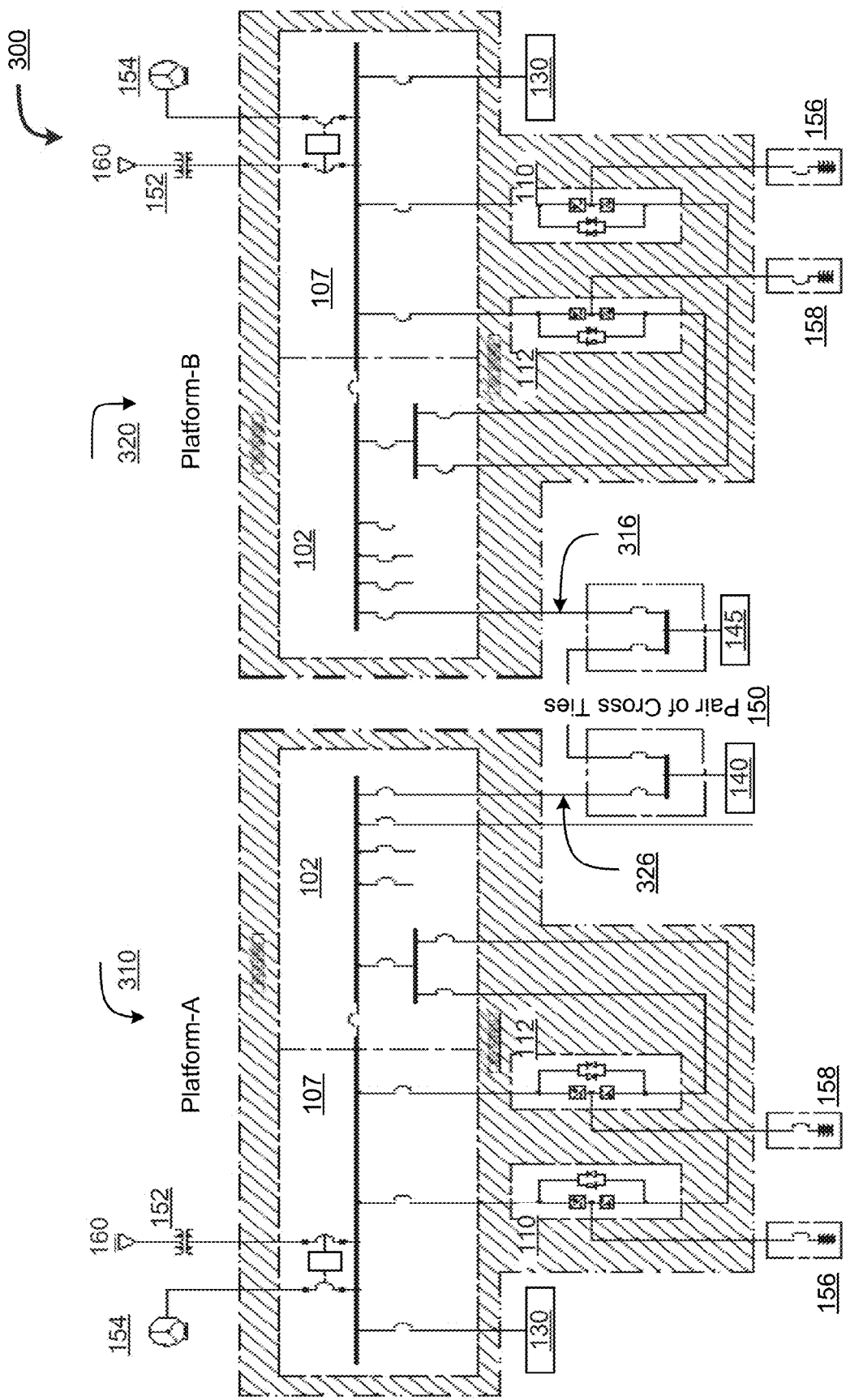
FIG. 3A is a single line diagram showing two electrical power distribution platforms, each distribution platform with its own cross tie and electrical connection to the cross tie.

FIG. 3A is a single line diagram showing two electrical power distribution platforms, each distribution platform with its own cross tie and electrical connection to the cross tie. A first and second electrical power distribution platforms connect via electrical connections 316 and 326 to the pair of cross ties 150, supplying power to a set of dual corded critical electrical loads, each via their own cross ties. FIG. 3A shows diagram 300 which includes two electrical power distribution platforms 310 (Platform-A) and 320 (Platform-B). Each power platform 310 or 320 shown in FIG. 3A has a single utility transformer 152 and diesel generator 154 and a single main and essential switchboard 107. The main and essential switchboard 107 is equipped with two transfer pair circuit breakers 121 and 123, which transfer between utility and generator power, two circuit breakers 117 and 119 for connection to the UPS units, and one circuit breaker 131 for connecting to the essential load connection 130. Each power platform 100 has two UPS units 110 and 112. The design deploys two discrete platforms 100 that are connected together by a pair of cross ties 150 where electrical connections 326 and 316 couple the critical switchboard cabinet 102 of Platform-A and the critical switchboard cabinet 102 Platform-B to the pair of cross ties 150. In an example, the electrical connections 316 and 326 can be busways. The pair of cross ties is described below with respect to FIG. 4.

Figure 3B:
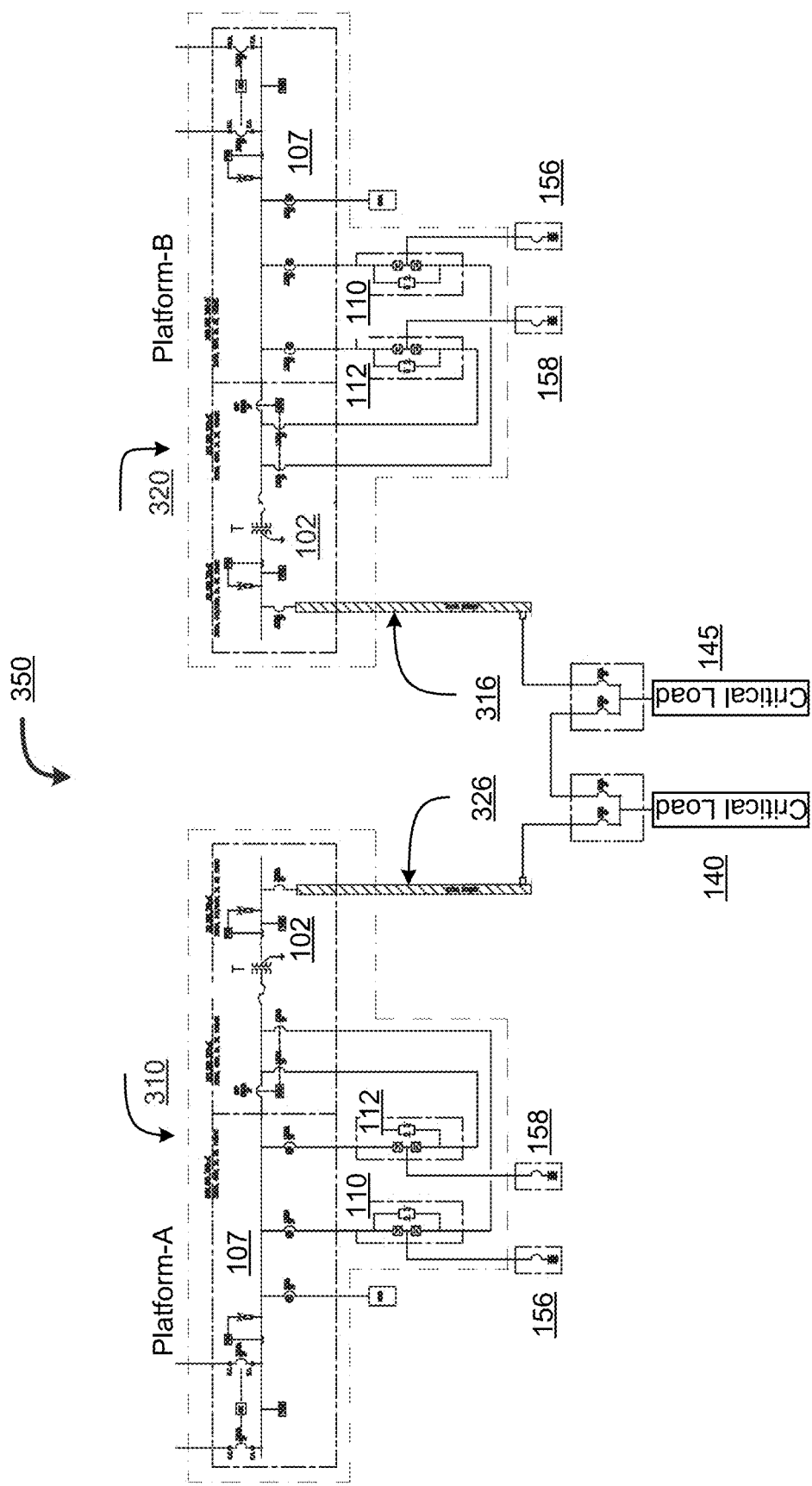
FIG. 3B is a single line diagram showing two electrical power distribution platforms, each distribution platform with its own cross tie and a busway electrical connection to the cross tie.

FIG. 3B is a single line diagram showing two electrical power distribution platforms, each distribution platform with its own cross tie and a busway electrical connection to the cross tie. A first and second electrical power distribution platforms connect via electrical connections 316 and 326 to the pair of cross ties 150, supplying power to a set of dual corded critical electrical loads, each via their own cross ties. FIG. 3B shows diagram 350 which includes two electrical power distribution platforms 310 (Platform-A) and 320 (Platform-B). The design deploys two discrete platforms 100 that are connected together by a pair of cross ties 150 where electrical connections 326 and 316 couple the critical switchboard cabinets 102 of Platform-A and Platform-B to the pair of cross ties 150. As shown, the electrical connections 316 and 326 in FIG. 3B can be busways and the critical switchboard cabinet 102 can include a stepdown transformer (T). The pair of cross ties is described below with respect to FIG. 4.

Thus, a first electrical power distribution platform is electrically configured to distribute electric power to the dual corded electrical loads which are configured to receive AC power supplied from to the first electrical power distribution platform as well as a second electrical power distribution platform. Thus, the first electrical power distribution platform as well as a second electrical power distribution platform are configured to supply electrical power to that set of dual corded electrical loads.

A third electrical power distribution platform includes a third switchboard cabinet with two or more circuit breakers. The third electrical power distribution platform, via a fifth circuit breaker in the third switchboard cabinet, electrically connects to a fifth cross tie that then electrically connects to the second set of the dual corded electrical loads. The third electrical power distribution platform via, a sixth circuit breaker in the third switchboard cabinet electrically connects to a sixth cross tie that then electrically connects to the third set of the dual corded electrical loads. The interlaced pattern of supplying other sets of dual corded electrical loads from two electrical power distribution platforms further repeats.

Most Information Technology electrical equipment such as Servers, Network switches, etc. has double electrical cords, but some are single corded or poly-corded.

The first cross tie and the third cross tie are configured to connect to each other via their own manually operated input/output circuit breakers to form a first pair of cross ties. The first pair of cross ties is configured to receive AC electrical power from the first and second electrical power distribution platforms. The first set of the dual corded electrical loads is configured to receive AC electrical power from the first electrical power distribution platform which connects, via the first cross tie of the first pair of cross ties, to a first electrical cord of the first set of the dual corded electrical loads. The first set of the dual corded electrical loads is also configured to receive AC electrical power from the second electrical power distribution platform that connects, via the third cross tie of the first pair of cross ties, to a second electrical cord of the first set of the dual corded electrical loads.

The second cross tie and the fifth cross tie are configured to connect to each other via their own manually operated input/output circuit breakers to form a second pair of cross ties. The fourth cross tie and the sixth cross tie are configured to connect to each other via their own manually operated input/output circuit breakers to form a third pair of cross ties. In an example, each cross tie connects to of the cords of the dual corded electrical loads.

The first cross tie and the third cross tie electrically connect via a pair of manual input/output circuit breakers to form a first pair of cross ties. The first pair of cross ties electrically connects to the first set of dual corded electrical loads to maintain AC electrical power supplied to the first set of dual corded electrical loads in moments of service or when maintenance is performed on one of upstream power distribution platforms of 1) the first electrical power distribution platform, or 2) the second electrical power distribution platform.

The first pair of cross ties connects to the first set of electrical loads. Each load of the first set of electrical loads has dual AC electrical power cords such that each electrical power cord is configured to receive AC electrical power from one of the two power distribution platforms. When closing the pair of manual input/output circuit breakers, AC electrical power from a single electrical power distribution platform is supplied to both electrical power cords going into each load of the first set of dual cord electrical loads.

A seventh cross tie and an eighth cross tie are configured to connect to each other via their own manually operated input/output circuit breakers to form a fourth pair of cross ties. The fourth pair of cross ties is installed initially along with the first through sixth cross ties in a mission critical facility. The seventh and the eighth cross ties are not initially electrically coupled to the respective power distribution platforms.

A first diesel generator is initially installed and electrically connected to a first main switchboard cabinet of the first power distribution platform. A second diesel generator is configured to be installed and to be electrically connected to a second main switchboard cabinet of a fourth power distribution platform after the initial installation of the mission critical facility.

The radial distribution bus and pairs of manual cross ties are installed initially along with some initial amount of electrical power distribution platforms. Then in the future, additional electrical power distribution platforms and diesel generators are installed and added after the initial installation at the data center. The additional electrical power distribution platforms and diesel generators can then easily connect into the already existing pairs of manual cross ties without having to remove electrical power from the critical electrical loads at that data center.

Installing the maximum number of expected number of crossties at the initial installation at a data center based on the anticipated maximum electrical capacity/consumption of the datacenter in electrical megawatts. Installing extra pairs of crossties in the radial distribution system at the initial installation, allows for not having to install the actual electrical power distribution platform or diesel generator at the initial installation saving millions of dollars in the initial capital expenditure costs. Later in the future, additional electrical power distribution platforms and diesel generators can be installed if the actual electrical power need arises at the data center.

Adding a generator and additional electrical power distribution platform allows the capital cost of building a complex that supports critical electrical loads that can never loose electrical power during their operation to occur as the demand for the amount of electrical capacity increases over time. After the initial construction of the building, as needed in the future, when electrical power consumption goes up for that building, then a new electrical power distribution platforms and diesel generators may be installed and may become electrically connected into one or more cross tie connections already installed at the commissioning and construction of that building.

Overtime, the amount of electrical power distribution systems and diesel generators installed and constructed at a building site can be added onto and then connected into an operational datacenter without powering down the critical electrical loads at that datacenter. When the electrical system is initially installed, the electrical system can be configured with one or more additional pairs of cross ties than necessary to connect to the current or initial installation of amount of electrical distribution platforms. Thus, during the initial installation of the electrical power distribution systems, the number of cross tie pair connections connecting to each other outnumbers the number of electrical power distribution platforms by at least one and typically by 3 or more. Thus, additional cross tie pairs are installed into the radial bus distribution system and the number of installed cross tie pairs are more than the number needed for the initial amount of electrical power distribution platforms installed at a data center.

One or more additional power distribution platforms and one or more diesel generators are configured to be installed and to be electrically connected into the radial bus SRDDS after the initial installation of the mission critical facility. The installation of the additional one or more electrical power distribution platforms are configured to occur into the already existing fourth pair of cross ties without removing AC electrical power from critical electrical loads of the mission critical facility. A predefined number of expected pairs of cross ties are installed at the initial installation of the mission critical facility based on an anticipated maximum electrical capacity of the mission critical facility in electrical megawatts.

The initial amount of cross ties installed in a radial bus SRDDS is at least just one crosstie greater than the number of crossties needed to typically support the maximum load to be connected and distributed in the radial distribution system.

In an embodiment, the radial electrical bus interlaced technique for a shared resource distributed electrical power distribution system can be implemented as follows. Each electrical power distribution platform can either be preassembled at the factory or the components can be assembled 'on-site'. The typical shared resource distributed electrical power distribution system (SRDDS) deploys two to four modular power centers (such as electrical power distribution platforms 100). The SRDDS allows both critical and essential electrical power produced and distributed by the electrical power distribution platforms. Each electrical power distribution platform can easily be shared by any number of individual users (electrical loads). The SRDDS is fully Uptime Institute Tier III Compliant, redundant, concurrently maintainable, and Fault Tolerant.

Each electrical power distribution platform can have 1) one or more static Uninterruptable Power Supplies (UPS) units, 2) one or more critical switchboard cabinets to supply conditioned continuous AC power to respective critical electrical loads, 3) one or more essential switchboard cabinets to supply AC electrical power to respective essential electrical loads, and 4) one or more main switchboard cabinets to receive AC electrical power from one or more sources of AC electrical power.

Figure 4:
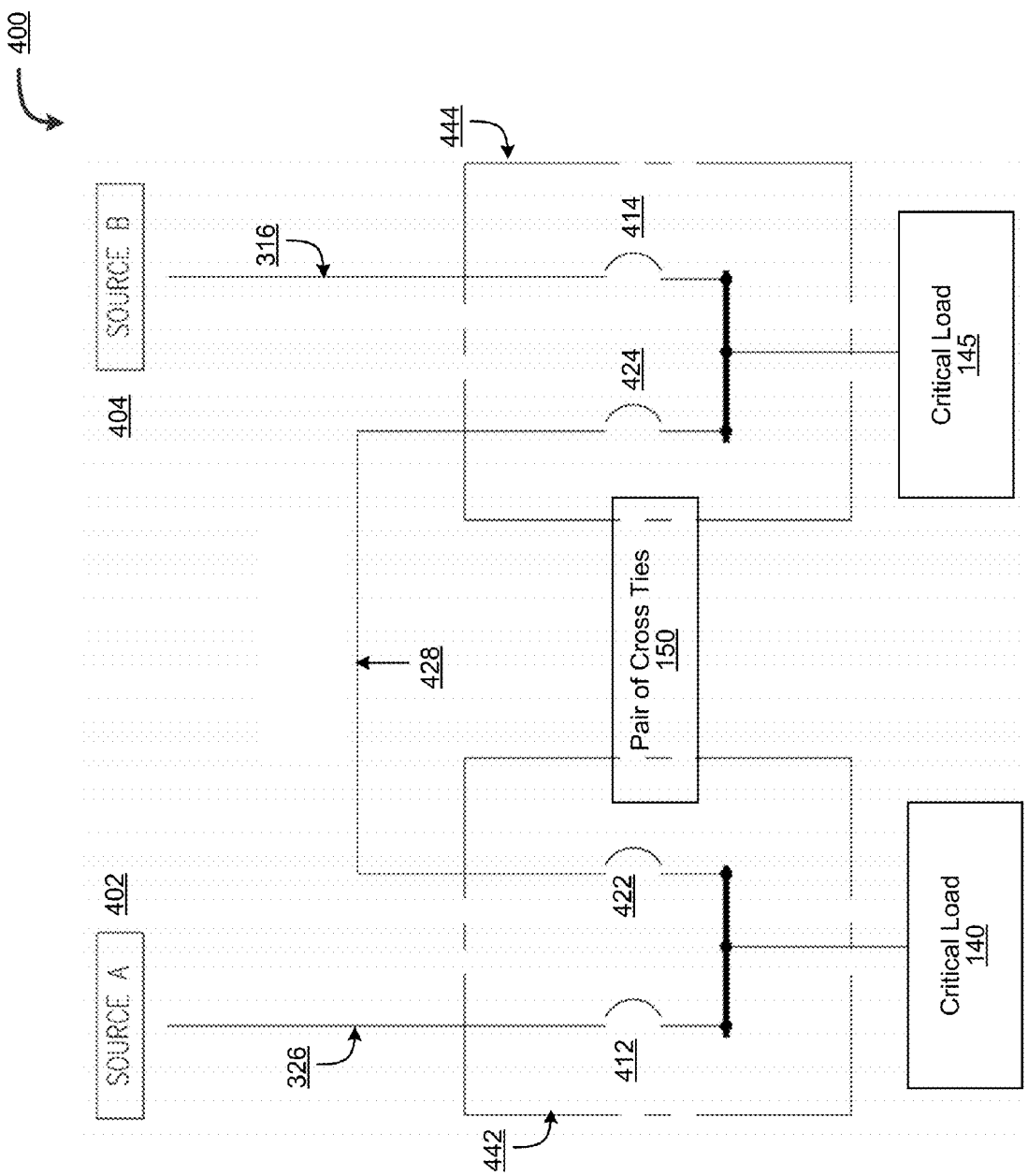
FIG. 4 is single line diagram showing the paring of two cross ties into a single paired Cross Ties.

FIG. 4 is single line diagram showing the paring of two cross ties into a single paired Cross Ties. FIG. 4 shows diagram 400 that includes the pair of cross ties 150. The pair of cross ties includes cross tie cabinets 444 and 442 each having a pair of manually operated circuit breakers and the electrical connection 428 between the cross tie cabinets 444 and 442. The cross tie cabinet 442 is coupled through normally closed circuit breaker 412 and electrical connection 326 (e.g. busway) to AC power source 402 (e.g., SOURCE A). The cross tie cabinet 442 can receive AC electrical power from electrical power source 402 which can be the critical switchboard cabinet 102 of an electrical power distribution platform, e.g., 310 (Platform-A) and as well can deliver AC electrical power through critical load connection 140 to critical loads. The cross tie cabinet 444 is coupled through normally closed circuit breaker 414 and electrical connection 316 (e.g., busway) to AC power source 404 (e.g., SOURCE B). The cross tie cabinet 444 can receive AC electrical power from electrical power source 404 which can be the critical switchboard cabinet 102 of an electrical power distribution platform, e.g., 320 (Platform-B) and likewise can deliver AC electrical power through critical load connection 145 to critical loads. The cross tie cabinets 442 and 444 are configured to electrically connect to each other through circuit breakers 424 and 422 and electrical connection 428.

The electrical loads including the critical electrical loads can be dual corded and when coupled to a pair of cross ties can receive AC electrical power from a first cord through critical load connection 140 and from a second cord through critical load connection 145.

The circuit breakers 412 and 414 are normally closed. The circuit breakers 424 and 422 are normally open and the cross tie cabinets 442 and 444 are not normally connected. As an example, when electrical power source 404 (SOURCE B) fails or is disconnected for maintenance, the circuit breaker 414 opens and the circuit breakers 422 and 424 close, causing the first and second cords of the dual corded electrical loads to be coupled to the electrical power source 402 (SOURCE A). Likewise, when electrical power source 402 (SOURCE A) fails or is disconnected for maintenance, the circuit breaker 412 opens and the circuit breakers 422 and 424 close, causing the first and second cords of the dual corded electrical loads to connect to the electrical power source 404 (SOURCE B). In an example, the circuit breakers 412, 422, 424, and 414 are Static Transfer Switches (STS). In an example, Static Transfer Switches typically operate at 40 ms allowing continuous flowing of conditioned AC power to the electrical load to ensure that the critical electrical load operates properly. In another example the transfer in the STS switches can be completed in less than a quarter of a cycle.

Each manual cross tie has a first input circuit breaker connecting to a respective electrical power distribution platform and a second input/output circuit breaker connecting and pairing to another cross tie. The second input/output circuit breakers of the cross ties connecting between a pairs of cross ties are manually operated. The first input circuit breaker of each cross tie allows a power distribution platform coupled to the first input circuit breaker to be electrically opened and to be de-energized for maintenance or service. The second input/output circuit breaker of each cross tie is nominally open and is configured to be manually operated and to become manually closed. The potential of closing the second input/output circuit breaker of each cross tie allows dual corded critical electrical loads connected downstream of a pair of cross ties to potentially receive AC electrical power to both of the dual cords of a set of the dual corded electrical loads downstream from the pair of cross ties.

The first electrical power distribution platform and the second electrical power distribution platform connect to that set of dual corded electrical loads via a pair of manual cross ties connected to each other. FIG. 4 is a single line diagram showing a single paired Cross Tie arrangement between two cross ties and their corresponding upstream electrical power distribution platforms.

As shown in FIG. 4, each cross tie of the pair of cross ties has a first input circuit breaker connecting to its respective electrical power distribution platform as well as a second input/output circuit breaker connecting to its paired cross tie. The set of second input/output circuit breakers connecting between the pair of cross ties must be manually electrically closed. In the pair of cross ties, each cross tie allows the first input circuit breaker to be electrically opened up to let that electrical power distribution platform to be de-energized for maintenance or service, while then allowing the set of second input/output circuit breakers connecting between the pair of cross ties to be manually electrically closed. The set of second input/output circuit breakers connecting between the pair of cross ties being electrically closed will still allow critical electrical loads connected the downstream of the pair of cross ties, that typically are dual corded, still receive power to both of the dual cords.

The radial electrical distribution system approach gives inherent independence of power supply allowing one of the electrical power distribution platforms providing power to a dual corded electrical load, to be removed as one of the lead sources but still have electrical power on both of the dual cords. The input breaker of the manual crosstie opens up to de-energized the electrical power distribution platform and the input circuit breaker coming from the another pairing crosstie connected to another electrical power distribution platform closes.

Each electrical power distribution platform has an electrical connection and a circuit breaker going to its own first cross tie that then supplies power to one of the cords of a downstream dual corded electrical critical loads. The first crosstie pairs through a manually activated input/output circuit breaker with a second crosstie, which the second crosstie connects on its output to the second cord of the dual corded downstream electrical critical load. The second cross tie also has its own input circuit breaker that connects back to its own electrical power distribution platform.

The first electrical power distribution platform connects to a set of dual corded electrical loads via the pair of manual cross ties in order to supply AC power to typically to a first electrical cord of the device. The second electrical power distribution platform connects to a set of dual corded electrical loads via the same pair of manual cross ties in order to supply AC power typically to a second electrical cord of the device. The pair of cross ties connects to the set of electrical load with dual AC power cords and can be manually operated to allow electrical power from a single distribution power to power both electrical cords going into each device in the set of dual cored electrical devices.

The purpose of manual operation of cross tie is to maintain power distribution to that set of dual corded electrical loads in moments of service or when maintenance is required on the upstream equipment/power distribution platform providing power. And thus, the paired manually operated cross tie keeps a set of dual corded electrical power loads receiving electrical power, for each device in the set, from both of the electrical cords connecting to that device, when one of the upstream electrical power distribution platform or any other upstream electrical AC source is taken off-line. The electrical loads with dual electrical cords still receive AC power from both electrical power cords via the electrical connection made at the manual cross tie.

Figure 5:
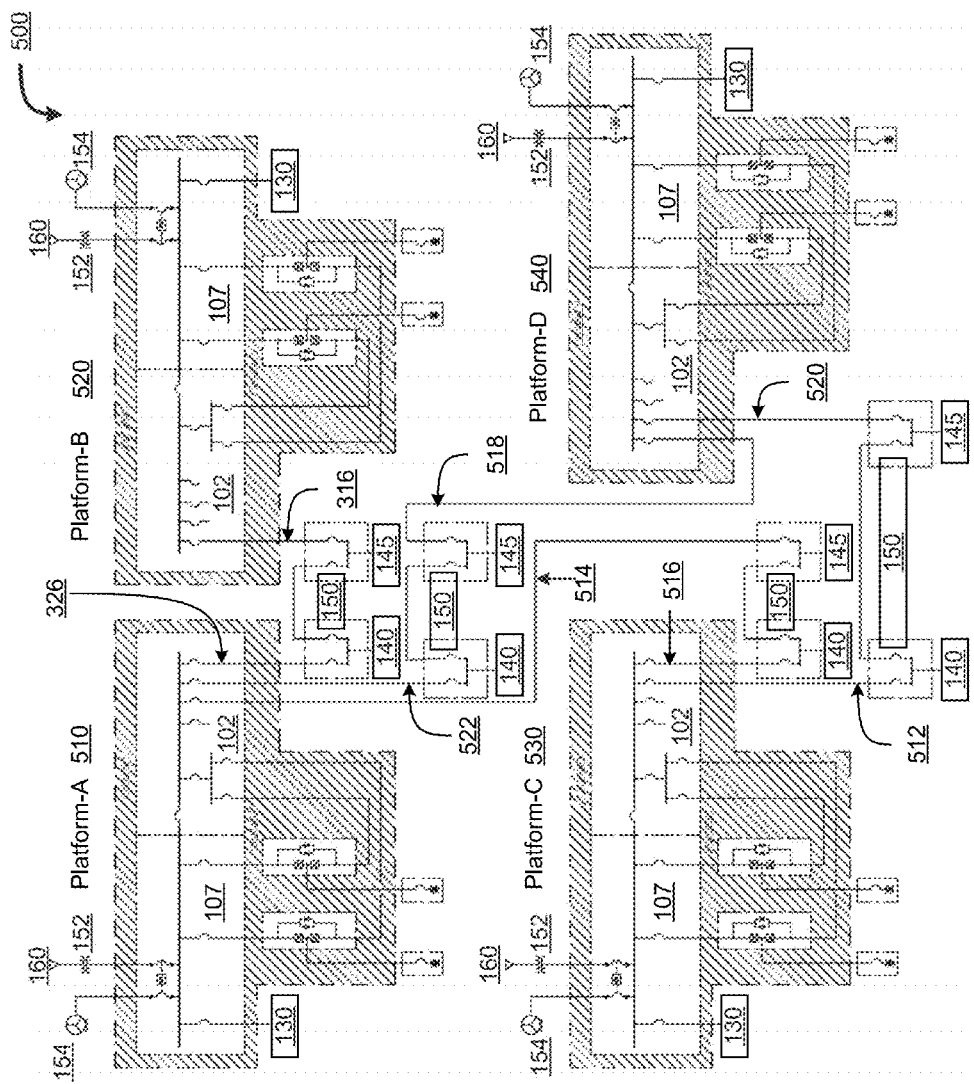
FIG. 5 is a single line diagram showing multiple electrical power distribution platforms, each distribution platform with its own cross tie and electrical connection and circuit breaker to that cross tie, and is an example of the radial electrical power distribution concept.

FIG. 5 is a single line diagram showing multiple electrical power distribution platforms, each distribution platform with its own cross tie, and electrical connection and circuit breaker to that cross tie and is an example of the radial electrical power distribution concept. FIG. 5 shows an embodiment of a radial bus SRDDR deployment in diagram 500. The electrical power distribution platforms in diagram 500 each have one critical switchboard cabinet 102. Diagram 500 has four of the modular electrical power distribution platforms 100 that are shown in FIG. 1. Each power platform 100 has a single utility transformer 152 and a diesel generator 154 and a single main and essential switchboard 107. The main and essential switchboard 107 is equipped with two transfer pair circuit breakers 121 and 123, which transfer between utility and generator power, two circuit breakers 117 and 119 for connection to the UPS units and one circuit breaker 131 for connection to essential load connection 130. Each electrical power platform 100 has two UPS units 110 and 112. The radial bus SRDDS design deploys four discrete electrical power distribution platforms that are connected together by a radial bus configuration. The radial bus SRDDS 500 has four utility transformers and four generators. A complete radial bus SRDDS can have four electrical distribution platforms that operate independently and there are no interconnections between the platforms. A complete SRDDS can have four utility transformers and four generators. The SRDDS design may not require a single utility source feed the four different SRDDS utility transformers. The SRDDS design can deploy four generators that like the UPS units the generators operate completely independently. Contrary to the operation of parallel systems, no provisions such as synchrony need to be made to ensure how the generators operate.

A complete radial bus SRDDS 500 can be comprised of four electrical power distribution platforms 510, 520, 530, and 540. As shown on the single line diagram 500, the power platforms are connected together by pairs of cross ties. The electrical power distribution platforms 510 (Platform-A) and 520 (Platform-B) are coupled to each other via the electrical connection 316 and 326 to a pair of cross ties 150. The electrical power distribution platforms 510 (Platform-A) and 530 (Platform-C) are coupled to each other via the electrical connection 514 and 516 to a pair of cross ties 150. The electrical power distribution platforms 510 (Platform-A) and 540 (Platform-D) are coupled to each other via the electrical connection 518 and 522 to a pair of cross ties 150. The electrical power distribution platforms 510 (Platform-C) and 540 (Platform-D) are coupled to each other via the electrical connection 512 and 520 to a pair of cross ties 150. Thus each electrical power distribution platform is at least connected via a pair of cross ties to another electrical power distribution platform. In an example, each electrical power distribution platform is at least connected via a pair of cross ties to two other electrical power distribution platforms. It is important to keep the length of the radial bus feeders as short as possible.

As shown in diagram 500 of FIG. 5, the first electrical power distribution platform 510 includes a first switchboard cabinet with two or more circuit breakers, e.g., circuit breaker 111 and 113 as labeled in FIG. 1. The first electrical power distribution platform 510, via a first circuit breaker 111 in the first switchboard cabinet, electrically connects via connection 514 to a first cross tie that then electrically connects to a first set of the dual corded electrical loads through electrical load connection 145. The first electrical power distribution platform 510, via a second circuit breaker 113 in the first switchboard cabinet, electrically connects via connection 522 to a second cross tie that then electrically connects to a second set of the dual corded electrical loads through electrical load connection 140.

Also as show in diagram 500 of FIG. 5, the second electrical power distribution platform 530 includes a second switchboard cabinet with two or more circuit breakers, e.g., circuit breaker 115 and 113 as labeled in FIG. 1. The second electrical power distribution platform 530, via a third circuit breaker 115 in the second switchboard cabinet, electrically connects via connection 516 to a third cross tie that then electrically connects to the first set of the dual corded electrical loads through electrical load connection 140. The second electrical power distribution platform 530, via a fourth circuit breaker 113 in the second switchboard cabinet electrically connects via connection 512 to a fourth cross tie that then electrically connects to a third set of the dual corded electrical loads through electrical load connection 140.

An embodiment of a radial SRDDS deployment 500 features multiple modular power platforms 510, 520, 530, and 540. Each platform has a single utility transformer 152 and generator 154 and a single main and essential switchboard 107. The main and essential switchboard is equipped with two transfer pair circuit breakers 121 and 123, which transfer between utility and generator power and supply AC electrical power through two circuit breakers 117 and 119 for the UPSs and through one circuit breaker 131 for essential load connection 130. Each power distribution platform 100 has two UPSs 110 and 112. The UPSs are connected in a distributed parallel configuration. The Mission Critical Facility's back up power supply system deploys a large number of static UPSs in a distributed parallel arrangement. The large number of UPSs are structurally electrically connected via the radial bus and their control equipment is configured to synchronize the outputted voltage and frequency coupled to each pair of cross ties and to operate electrically in parallel. Distribution from the modular power center is from the critical power distribution switchboards and the essential power distribution switchboard. In an example, the essential power distribution switchboard and the main switchboard are combined into a main and essential switchboard the distribution from the modular power center is from the critical power distribution switchboards and the main and essential power distribution switchboard.

Figure 6:
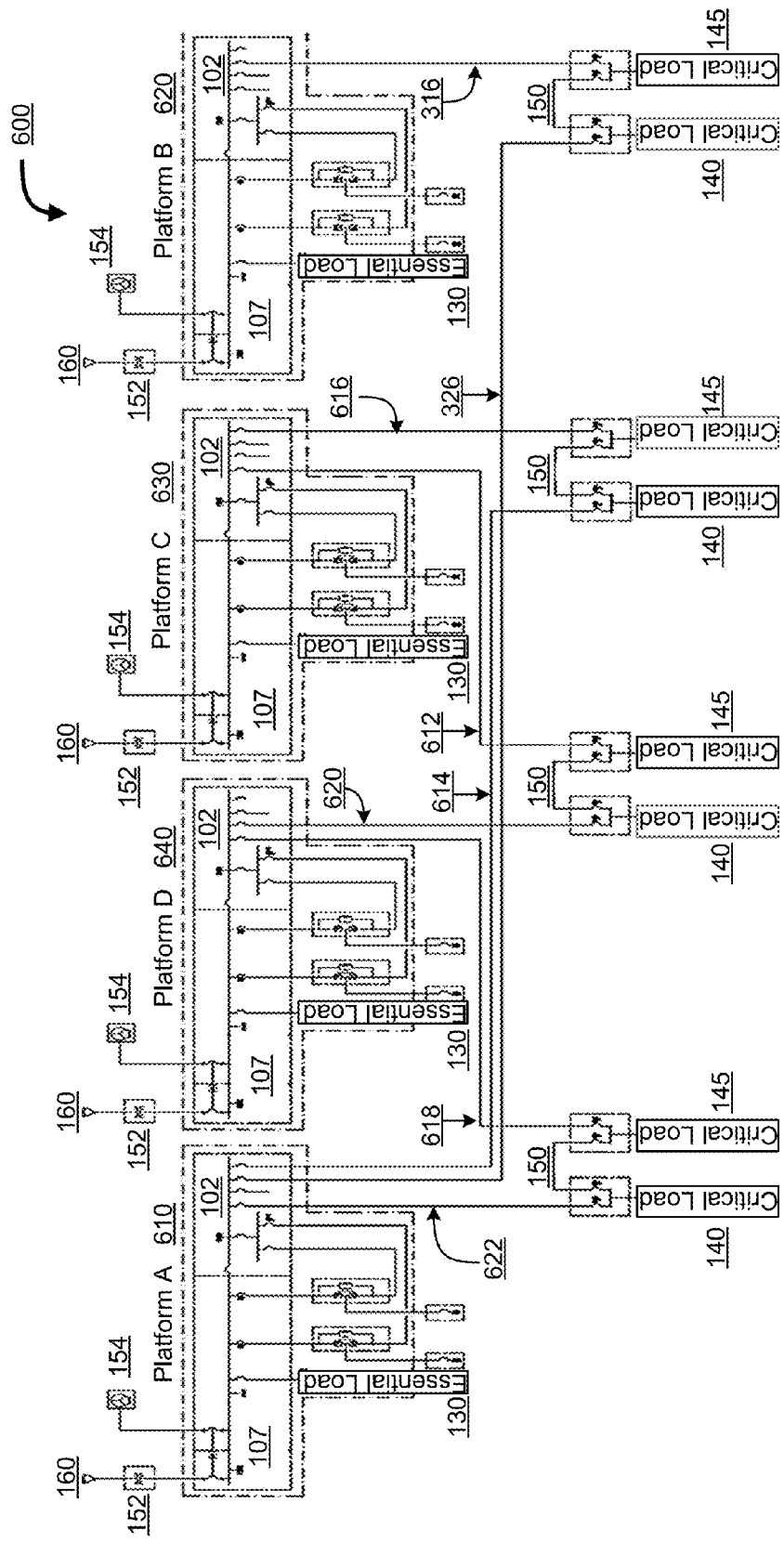
FIG. 6 is a single line diagram showing how four power distribution platforms are interconnected by a radial bus.

Thus, as shown in FIGS. 5 and 6, multiple electrical power distribution platforms each have one or more electrical power connections to interconnect to a radial power distribution bus to power downstream electrical loads in a woven or interlaced fashion via two or more cross ties, where the electrical loads are dual corded and configured to be powered by two AC electrical sources.

The pair of cross ties provide electrical connection between critical switchboard cabinets 102 of different electrical power distribution platforms 100 to supply AC electrical power to critical electrical loads from multiple electrical power distribution platforms. In an example, each essential equipment load is coupled to a single electrical power distribution platform. In another example, the essential electrical loads can to couple to multiple electrical power distribution platform via a radial bus arrangement.

Figure 7:
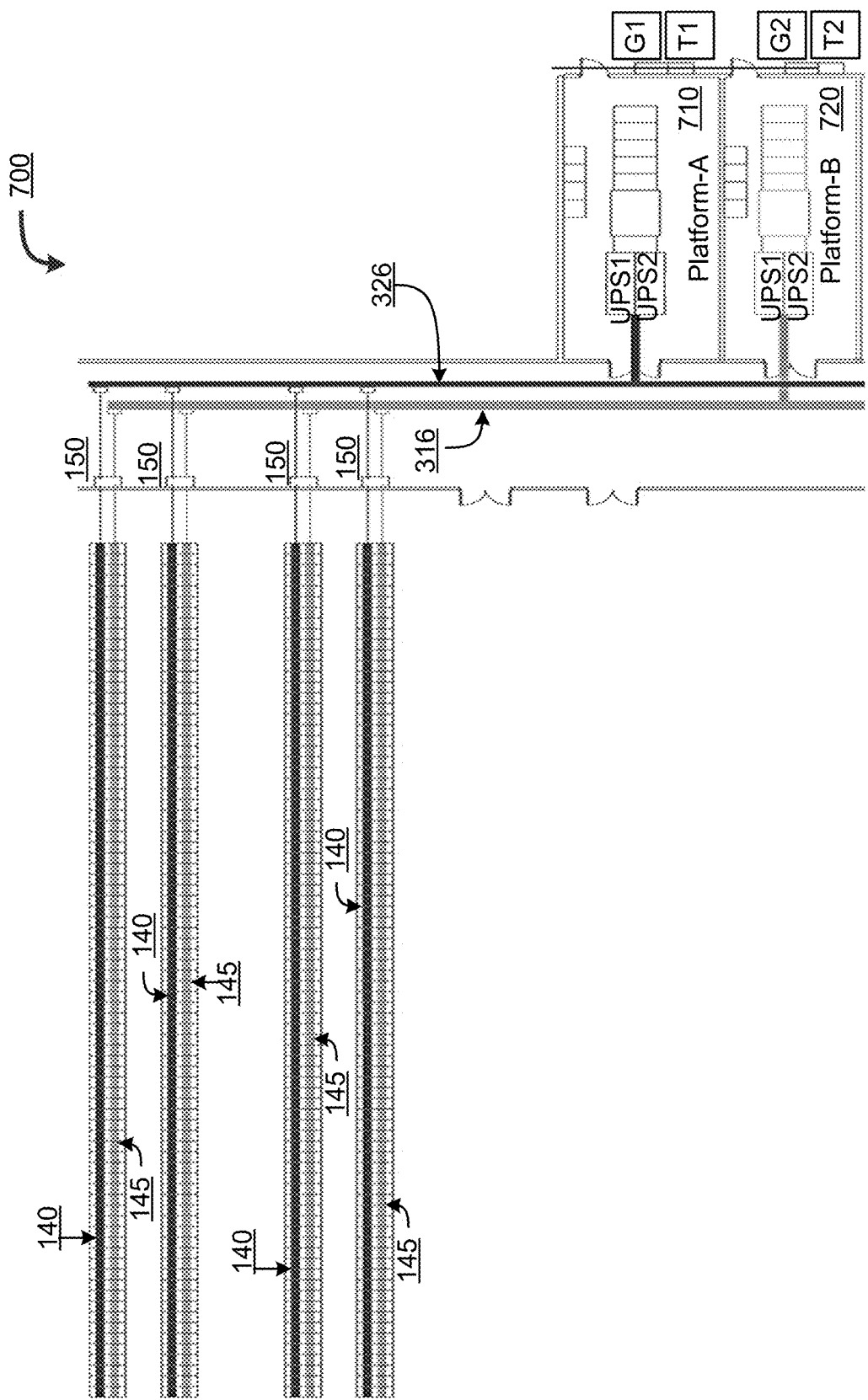
FIG. 7 shows two power distribution platforms connected through pairs of cross ties to critical load connections.

Two or more electrical power distribution platforms connect to the radial power distribution bus via two or more cross ties to power downstream electrical loads that are dual corded in a woven or interlaced fashion. For example, the woven interconnection scheme is shown in FIGS. 5, 6, and 7. The first electrical power distribution platform includes two or more circuit breaker connections for the first electrical power distribution platform to connect with a two or more cross ties. The first electrical power distribution platform via a first circuit breaker connects to a first cross tie and a first set of dual corded electrical loads. The first electrical power distribution platform via a second circuit breaker electrically connects to a second cross tie that electrically connects to a second set of dual corded electrical loads. A second electrical power distribution platform includes two or more circuit breaker connections for the second electrical power distribution platform. The second electrical power distribution platform via a third circuit breaker connects to a third cross tie and the first set of dual corded electrical loads. The second electrical power distribution platform via a fourth circuit breaker electrically connects to a fourth cross tie that electrically connects to a third set of dual corded electrical loads. A third electrical power distribution platform includes two or more circuit breaker connections for the third electrical power distribution platform to connect to two or more cross ties. The third electrical power distribution platform via a fifth circuit breaker connects to a fifth cross tie and the second set of dual corded electrical loads. The third electrical power distribution platform via a sixth circuit breaker electrically connects to a sixth cross tie that electrically connects to the third set of dual corded electrical loads. This interwoven pattern of supplying dual corded electrical loads from multiple electrical power distribution platforms can repeat itself over and over again. A full woven interconnection scheme simply incorporates the amount of two or more electrical power distribution platforms divided into the number of sets of dual corded electrical loads and replicates the above initial woven pattern of supplying AC power to both electrical cords until the quantity of electrical power distribution platforms meet the needed electrical power capacity for all of the sets of dual corded electrical loads. FIG. 7 shows two electrical power distribution platforms each connecting to two manual cross ties as described in the example above. FIGS. 5 and 6 show four electrical power distribution platforms each connecting to two manual cross ties; and thus, the sets of critical electrical loads would be split up in an interwoven radial distribution bus system among the four electrical power distribution platforms and four pairs of cross ties. The weaving or interlacing of electrical loads allows for having smaller amperage circuit breakers because less electrical load is being sent to that particular weaved group of electrical loads rather than a set of all of the electrical loads. The load-balancing between the multiple electrical power distribution platforms is weaved or interlaced along the radial electrical busway amongst the rows of electrical power loads in a data center.

Thus, in the radial SRDDS, dual corded electrical loads are used and the loads are woven or interlaced so that alternative paired AC power sources are going to neighboring column of load connections 140 and 145 of FIG. 7 such that the dual corded electrical loads connect to alternative pairs of AC power sources.

Each electrical power distribution platform has an electrical connection to its manual cross tie, which then that manual cross tie has a connection to another cross tie coming from another electrical power distribution platform in order for the combination of the two cross ties to allow one of the electrical power distribution platforms to be completely powered down and does not affect the downstream dual corded electrical power loads from receiving AC electrical power on both of the cords. When one of the cross ties electrically opens its electrical connection to the nominally connected upstream electrical power distribution platform, the nominally connected electrical power distribution platform gets disconnected and the connection to the other cross tie closes which causes merely a single source of electrical power to supply power to both cords of those electrical loads so that service or maintenance can be performed on the disconnected electrical power distribution system.

The radial SRDDS utilizes pairs of cross ties to supply power to critical electrical loads that require two AC power cords. Nominally, the critical electrical loads receive AC power from two separate sources and this scheme provides an inherent flexibility to temporarily provide both AC power cords with AC power from a single source while the one of the nominal two sources is undergoing maintenance or otherwise purposely powered off. However, the radial electrical distribution system utilizing pairs of cross ties still provides continuous electrical power to both of the dual cords plugged into the dual corded critical electrical loads.

Downstream of the critical load switchboards 102 in the first electrical power distribution platform 100 and upstream of a first cross tie is a step down transformer connected in series between the circuit breaker going out of the critical load switchboards and the input circuit breaker going into the first cross tie. The function of the step down transformer is to decrease the voltage from the amount of voltage coming out of the critical load switchboard and the busway then going to the cross tie and down eventually to the critical electrical loads connected to the cross tie. The step down transformer connected to the first cross tie is sized in capacity to power the critical electrical loads connected to the first electrical power distribution platform as well as to power the electrical critical loads connected to the second electrical power distribution platform which is connected via to a second cross tie paired with the first cross tie. The step down transformer connected to the cross tie reduces the need for having panel distribution units, each with their own small transformer, at the floor level to provide a step down voltage coming out of the main critical load distribution switchboard. For example, the step down transformer connected to the cross tie is sized in voltage capacity to reduce the 480 Volts AC out of the critical load switchboard to 120 VAC or 240 VAC that corresponds to input voltage that the electrical loads are configured to utilize.

A single step down transformer may be installed coming out of the critical switchboard cabinet or the essential switchboard cabinet for the critical or essential loads. The single step down transformer is placed before the electrical loads and replaces the need to have a transformer for each PDU at the floor to supply local segments of electrical loads at the proper step down voltage.

PLCs located in each main switchboard of the electrical power distribution platform controls their respected transfer pair circuit breakers.

One or more static uninterruptable power supply (UPS) units can be coupled to each electrical power distribution platform and can be configured to supply conditioned continuous power to the critical electrical loads. Each set of the critical electrical loads can be coupled by a shared pair of cross ties to the UPS units of two different electrical distribution platforms and to be configured to receive continuous conditioned power AC electrical power from the two electrical distribution platforms.

UPS controls can be located within each UPS. One UPS will become the master UPS with the other UPS slaving to the master. The UPS controls are tied together by the first communication network. The radial bus SRDDS uses static uninterruptible power supplies as opposed to rotary uninterruptible power supplies. The UPS controls are tied together by a CAN_BUS control network. ISO 11898 defines the CAN_BUS standards.

The static UPS units of the first power distribution platform and the static UPS units of the second power distribution platform connect to the respective critical switchboard cabinets of the first power distribution platform and the second power distribution platform via circuit breakers. The critical switchboard cabinets of the first power distribution platform and the second power distribution platform are coupled through circuit breaker to a first set of critical electrical loads that are downstream of the first pair of cross ties to supply conditioned continuous AC power to the first set of critical electrical loads.

The static UPS units of each electrical power distribution platform connect through circuit breakers to the critical switchboard cabinets, which then goes through other circuit breakers in the critical load switchboard cabinet to critical electrical load powered from that switchboard. The static UPS units electrically couple and supply conditioned continuous AC power to the critical electrical loads which need to have conditioned continuous electrical power at all times.

Each set of the static UPS units of each electrical power distribution platform has its own programmable logic controller. The programmable logic controllers of the UPS units of the first and the second power distribution platforms electrically synchronize a voltage and a frequency being supplied as conditioned continuous AC power out of the UPS units of both the first and the second power distribution platforms. The UPS units of both the first and the second power distribution platforms provide synchronized conditioned continuous AC power to both electrical cords going to the first set of critical electrical loads.

Generator Controls are located within each diesel generator. The generator controllers can be connected together by a CAN-BUS network. ISO 11898 defines the CAN_BUS standards.

At least one control system can be associated with each pair of cross ties to switch between the pair of electrical distribution platforms coupled to each pair of cross ties and to switch between the source of AC electrical power coupled to electrical loads of each pair of cross ties.

The system can have one or more UPS units connecting to the critical load switchboard on each of the electrical power distribution platforms. The one or more static uninterruptible power supplies connect via a circuit breaker to a critical load switchboard on a given electrical power distribution platform and then a set of critical equipment electrical loads are connected together by the pair of Cross Ties. Each of the one or more static UPS units connecting to a given electrical power distribution platform has its own programmable logic controller. Where the programmable logic controller between two different sets of static uninterruptible power supplies are configured to have the programmable logic controllers to electrically synchronize the voltage and frequency out of both sets of uninterruptible power supplies to act as a single uninterruptible power supply. The critical equipment electrical loads receiving their continuous conditioned AC power are connected by the pair of Cross Ties on the radial electrical bus.

The electrical loads are gathered into multiple load groups, each load group including one or more essential loads and critical loads. Each electrical power distribution platform is configured to distribute electrical power to a specific load group designated for that electrical power distribution platform. Each electrical power distribution platform is also configured in electrical connection and power capacity via a pair of cross ties to distribute electrical power to one or more other load groups where these loads are nominally designated to other electrical power distribution platforms. As an example, power can be supplied to non-designated loads of an electrical power distribution platform when a platform designated for that load fails. An example load group may have one or more critical loads and/or one or more essential load.

Also, the critical electrical loads can be divided into sets of critical electrical loads, and the essential electrical loads can be divided into sets of essential electrical loads. Each set of the critical electrical loads can be coupled to a shared pair of cross ties and can be powered by two different electrical power distribution platforms. Each set of the essential electrical loads can be coupled to a shared pair of cross ties and can be powered by two different electrical power distribution platforms.

As an example, a first electrical power distribution platform is electrically configured to distribute electrical power to critical electrical loads nominally supplied by that first electrical power distribution platform as well as is configured in power capacity and are electrically connected via a pair of cross ties to be able to distribute electrical power to critical electrical loads nominally supplied by a second electrical power distribution platform.

The system delivers a significant amount of redundant electrical power with far fewer electrical components than traditional redundant electrical distribution systems. Redundancy refers system to the critical distribution components; Transformers, Generators, UPSs. Redundancy requires that the system continue to operate at 100% capacity in the event any one of these components were to fail. The design reduces additional components needed to meet the redundancy requirement by 50% of the Transformers, Generators, UPSs and still meet uptime tier 3 requirements. The system meets the Uptime Institute's concurrently maintainable requirements. Also, buying multiple smaller MW components such as four 3-MegaWatt line transformers is cheaper than buying a single larger component such as one 12 Megawatt line transformer. The implementation of this system significantly reduces the cost of the facility's electrical distribution equipment while still meeting tier 3 requirements.

The addition of isolation breakers on each cabinet of the pair of cross ties to another switchboard, as well as isolation breakers from the AC power sources as well as isolation breakers between critical switchboards in an electrical power distribution platform, allows any component to be completely shut down and de-energized without shutting down any of the critical load because of the additional isolation breakers added.

Additional isolation circuit breakers can be placed between the critical switchboards of each electrical power distribution platform. An isolation circuit breaker is placed between the essential and main switchboards of each electrical power distribution platform. The isolation circuit breakers are required to be able to completely de-energize the individual switchboards while maintaining power to the energized switchboards. The addition of isolation breakers on each pair of cross ties to another critical switchboard as well as isolation breakers from the AC power sources as well as isolation breakers between critical switchboards of each power distribution platform, allows any component to be completely shut down and de-energized without shutting down any of the critical load because of the additional isolation breakers added. Note, the figure although shows one breaker for the loads but there can be two or more isolation circuit breakers.

Electrical impedance is the measure of the opposition that a circuit presents to a current when a voltage is applied. The magnitude of impedance is the ratio of the voltage amplitude to the current amplitude, where the percent of impedance is peak voltage divided by peak electrical current. Where the utility transformer connecting to the utility power input is a high impedance transformer with greater than 5% impedance and typically between up to 9% impedance so as to eliminate any need for an AIC inductive line reactor in order for that impedance to limit the maximum amount of total fault current in the system that is capable of being there prior to some overcurrent action such as a circuit breaker actuating. Each electrical power distribution platform can have its own a high efficiency utility transformer connecting to that SRDDS power center.

A utility transformer electrically couples between an AC utility grid and a main switchboard cabinet of the first power distribution platform. The utility transformer is configured to have an impedance of at least 5% and up to 9% to eliminate a need for an AIC line reactor to limit a maximum total fault current in the first power distribution platform. The maximum total fault current occurs before any over current protection actuates. In general the SRDDS design incorporates a, high efficiency utility transformer for each SRDDS power center.

The AIC line reactor and the high impedance transformer function is to limit the fault current that can occur in the system before and overcorrect device such as a breaker has a chance to actuate. The high impedance transformer or the AIC line reactor are located between the source of AC power and the main switchboard of the multiple of the electrical power distribution platforms.

The use of a single line reactor between the utility source of AC power and the main switchboard (or combined main and essential switchboard) cabinet of electrical power distribution platform removes the need to potentially place them in the distribution bus itself, which then requires one line reactor per segment of distribution bus.

The cross tie or static transfer switch allow for dual corded power to receive power from both courts while one of the nominal sources of power supply power to the two cords dual cords is powered down for maintenance or service.

In addition to the standard equipment described in FIG. 1, two line reactors can be added between the main switchboard and the utility transformer, the diesel generator which introduces in-line reactors at the AC source of power to reduce the maximum possible short circuit currents. Note, in an embodiment, each of the four electrical power distribution modules, would have its own excessive AIC line reactor connected to the AC sources of power and in position to limit a maximum amount fault current that can be generated in the system. In general, the radial bus SRDDS design incorporates a high impedance, high efficiency utility transformer for each power platform. The high impedance of the transformer will limit the incoming AC short circuit currents. The inrush currents shall be limited so that the AIC (amp incoming current) ratings of the equipment can be reduced to nominal ratings. In situations where excessive AC short circuit currents are present an additional line reactor can be installed to further reduce the magnitude of the short circuit currents. The excessive AIC line reactor is needed to reduce the systems short circuit amp when the utility short circuit amps are excessively high. The excessive AC control reactor (choke) is connected to the AC power sources of either the diesel generator 154 or is incorporated to the main AC power transformer 152. The main AC power transformer on the secondary side has its impedance increased, such as doubling the impedance, which will then reduce the maximum amount of fault current possible out of that AC power source. On the primary coil side, potentially add a capacitor to counterbalance the increased inductance of the power factor main AC power transformer presents to the electrical power grid. The choke does not couple to the output of the static UPS units as it does not need to because the maximum fault current would be 150% current.

It is intended that the line reactors to be used with installations which have excessively high short circuits currents presented to the main switchboard. The in-line reactor locations are tied to the transformer and the diesel generator AC power sources and no in-line reactors/chokes are directly connected to an output of the static UPS.

FIG. 6 is a single line diagram showing how four power distribution platforms are interconnected by a radial bus. FIG. 6 shows an embodiment of a radial bus SRDDR deployment in diagram 600. The electrical power distribution platforms in diagram 600 each have one critical switchboard cabinet 102. Diagram 600 has four of the modular electrical power distribution platforms 100 which are shown in FIG. 1. Each power platform 100 has a single utility transformer 152 and a diesel generator 154 and a single main and essential switchboard 107.

A complete radial bus SRDDS 600 can be comprised of four electrical power distribution platforms 100. As shown on the single line diagram 600, the power platforms are connected together by pairs of cross ties. The electrical power distribution platforms 610 (Platform-A) and 620 (Platform-B) are coupled to each other via the electrical connection 316 and 326 to a pair of cross ties 150. The electrical power distribution platforms 610 (Platform-A) and 630 (Platform-C) are coupled to each other via the electrical connection 614 and 616 to a pair of cross ties 150. The electrical power distribution platforms 610 (Platform-A) and 640 (Platform-D) are coupled to each other via the electrical connection 618 and 622 to a pair of cross ties 150. The electrical power distribution platforms 610 (Platform-C) and 640 (Platform-D) are coupled to each other via the electrical connection 612 and 620 to a pair of cross ties 150. Thus each electrical power distribution platform is at least connected via a pair of cross ties to another electrical power distribution platform. In an example, each electrical power distribution platform is at least connected via a pair of cross ties to two other electrical power distribution platforms. It is important to keep the length of the radial bus feeders as short as possible. In an example, the circuit breakers in the cross tie cabinets of the pairs of cross ties 150 are static transfer switches (STS).

Each main and essential switchboard cabinet 107 and each critical switchboard cabinet 102 has at least two circuit breaker and one or more bus bars to direct electricity from one or more sources of electrical power to electrical loads. The examples of electric loads are transformers, power distributions units, control equipment, and, ultimately, to individual electrical system loads. The bus bars of the critical switchboard cabinets of each electrical power distribution platform can be connected in series via isolation circuit breakers. Likewise, when there are more than one essential switchboard cabinet in an electrical power distribution platform, the bus bars of the essential switchboard cabinets of the electrical power distribution platform can be connected in series via circuit breaker, e.g. isolation circuit breakers.

The electrical power distribution platform can have more than one essential switchboard cabinet and the essential switchboard cabinets can be coupled in series. The essential loads are not coupled to the static UPS units because they are configured to tolerate momentary power outage and do not require conditioned continuous AC electric power.

FIG. 7 shows two power distribution platforms connected through pairs of cross ties to critical load connections. The diagram 700 show electrical power distribution platforms 710 (Platform-A) and 720 (Platform-B). The electrical power distribution platforms 710 and 720 are coupled through electrical connections 316 and 326 and through pairs of cross ties 150 to critical load connections 140 and 145.

FIG. 7 showing the dual corded electrical loads to receive power from two separate sources and then shows pairs of cross ties going between the two electrical power distribution platforms. Each cross tie is shown as a rectangle 150. In FIG. 7, each column of critical electrical load connections 140 or 145 in a data center possibly has its own Power Distribution Unit (PDU). By placing the step down voltage transformers in between the cross tie and the output breaker of the critical switchboard cabinet 102, the need for one PDU per column of load connections is eliminated.

As shown in FIGS. 4 and 7, the dual corded critical electrical loads, downstream of the cross ties, nominally receive power from two separate AC sources. However, if the pair of cross ties has the manual activated breakers between the pair of cross ties electrically closed and the input breaker to one of the electrical power distribution platforms opened, then the dual corded critical electrical loads, downstream of the cross ties, at this time receive AC electrical power from one AC power source. As shown in FIG. 7, nominally the first column/set of dual corded critical electrical loads receives electrical power for a first of their cords on the left side from the first electrical power distribution platform and receives AC power for the second of their dual cords from the second electrical power distribution platform on the right side. The next set/column of critical electrical loads that are dual corded receive power from two separate sources. This second set/column of critical electrical loads receives AC power from the first electrical power distribution platform on the left side and receives AC power from the third electrical power distribution platform on the right side. The third set/column of critical electrical loads that are dual corded receive AC power for a first of their cords from the second electrical power distribution platform on the left side and receive electrical power from the third electrical power distribution platform for the second of their dual cords on the right side.

As shown in FIG. 7, the electrical diagram shows a first and a second diesel generator G1 and G2 and a first and a second transformer T1 and T2. The first and second generator and the first and second transformer couple to its corresponding first electrical power distribution platform 710 (Platform-A) and second electrical power distribution Platform 720 (Platform-B). Each electrical power distribution platform has its static uninterruptable power supplies UPS1 and UPS2, critical load switchboard and essential electrical load switchboard. Each electrical power distribution platform connects to its own set of two or more cross ties 150.

Figure 8:
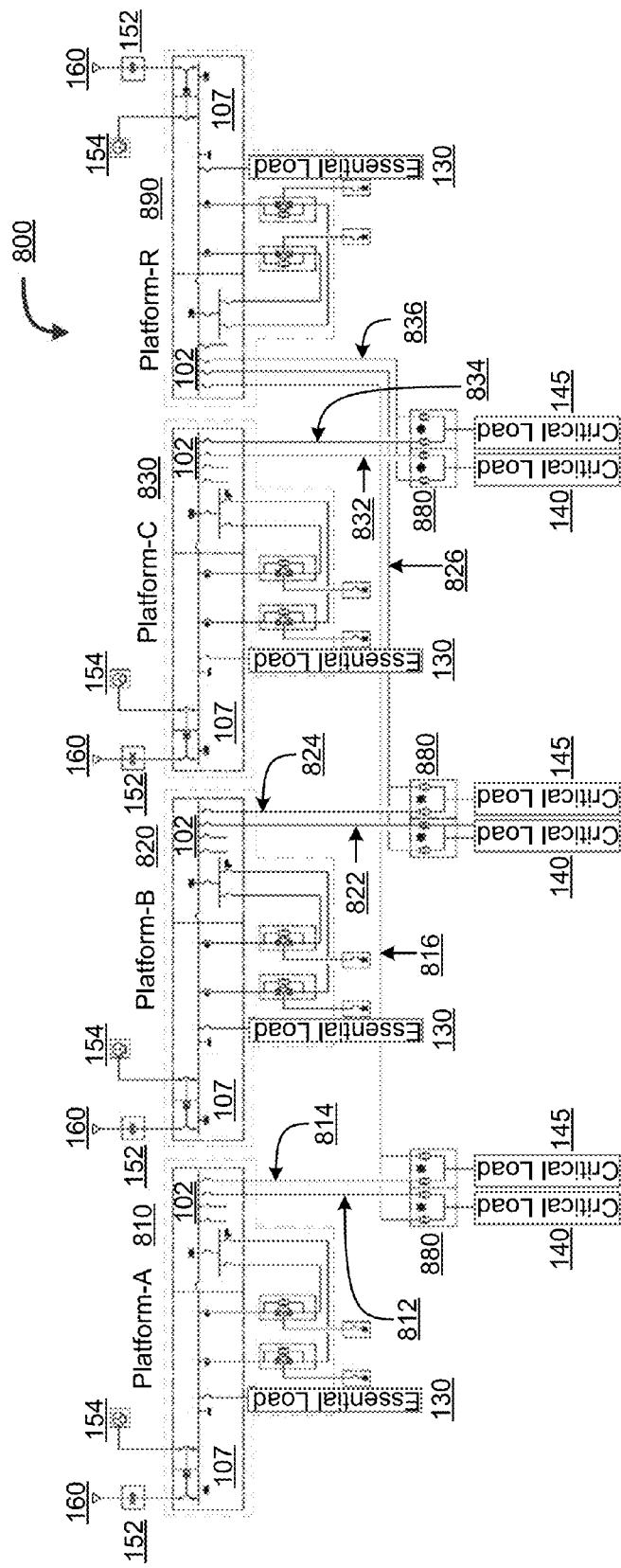
FIG. 8 is a single line diagram showing four power distribution platforms in a dual corded dual STS block redundant arrangement.

FIG. 8 is a single line diagram showing four power distribution platforms in a dual corded dual STS block redundant arrangement. FIG. 8 shows a block diagram 800 of an embodiment of four power distribution platforms in a dual corded dual STS block redundant arrangement. The electrical power distribution platforms in diagram 800 each have one critical switchboard cabinet 102. Diagram 800 has four of the modular electrical power distribution platforms 810, 820, 830, and 890. Each power distribution platform has a single utility transformer 152 and a diesel generator 154 and a single main and essential switchboard 107.

A complete dual corded dual STS block redundant arrangement 800 can be comprised of four electrical power distribution platforms 100. As shown on the single line diagram 800, the power platforms are connected together by pairs of cross ties. The electrical power distribution platforms 810 (Platform-A) and 890 (Platform-R) are coupled to each other via the electrical connection 812 and 810 to a pair of static transfer switches 880 that includes two static transfer switches (STS). The electrical power distribution platforms 820 (Platform-B) and 890 (Platform-R) are coupled to each other via the electrical connection 822 and 820 to a pair of STS. The electrical power distribution platforms 830 (Platform-C) and 890 (Platform-R) are coupled to each other via the electrical connection 832 and 830 to a pair of STS 880. Thus each electrical power distribution platform is at least connected via a pair of STS 880 to the electrical power distribution platform 890 (Platform-R) which the electrical power distribution platform 890 can act as a reserve for the other three electrical power distribution platforms 810, 820, and 830. In an example, the platform 890 is coupled to an essential load connection 130 but it does not have its own critical load connection. In an example, the static transfer switches (STS) are configured such that when one of the electrical power distribution platforms 810, 820, or 830 fails, the reserve electrical power distribution platform 890 takes over and provides conditioned continuous AC electrical power. The reserve electrical power distribution platforms, from power capacity and electrical connection can support the electrical loads of each one the other electrical power distribution platforms 810, 820, and 830. In an example, each static transfer switch of the pair of static transfer switches 880 is coupled to separate critical load connection 140 or 145. In an example, the pair of static transfer switches is configured such that the two STS switches operate together.

In an embodiment, a shared resource distribute electrical power distribution system can have three or more electrical power distribution platforms and two or more radial buses including at least one critical electrical radial bus to distribute conditioned continuous AC electrical power to critical electrical loads and at least one essential electrical radial bus to distribute AC electrical power to essential electrical loads. The electrical power distribution platforms can be coupled to the radial buses via cross ties. Every two cross ties can couple together to form pairs of cross ties where each cross tie can belong to only one pair or cross ties. In fact, pairing of the cross ties couples portions of the radial buses.

In an embodiment a Shared Resource Distributed electrical power Distribution System (SRDDS) can include multiple electrical power distribution platforms including a first electrical power distribution platform, a second electrical power distribution platform, and a reserve electrical power distribution platform. The SRDDS also includes a block power distribution bus to distribute AC electrical power to downstream electrical loads. The downstream electrical loads are dual corded. The dual corded electrical loads each have a first cord and a second cord and are configured to be powered by two separate AC electrical power sources. The multiple electrical power distribution platforms are coupled to the block power distribution bus via two or more cross ties to supply AC electrical power to the downstream electrical loads.

Each electrical power distribution platform of a SRDDS can have 1) one or more static Uninterruptable Power Supplies (UPS) units, 2) one or more critical switchboard cabinets to supply conditioned continuous AC power to respective critical electrical loads, and 3) one or more essential switchboard cabinets to supply AC electrical power to respective essential electrical loads.

The first electrical power distribution platform of a SRDDS can include a first switchboard cabinet with two or more circuit breakers. A first circuit breaker in the first switchboard cabinet electrically connects to a first cross tie that electrically connects to the first cord of a first set of the dual corded electrical loads. A second circuit breaker in the first switchboard cabinet electrically connects to a second cross tie that electrically connects to the second cord of the first set of the dual corded electrical loads.

The second electrical power distribution platform of a SRDDS can include a second switchboard cabinet with two or more circuit breakers. A third circuit breaker in the second switchboard cabinet electrically connects to a third cross tie that electrically connects the first cord of a second set of the dual corded electrical loads. A fourth circuit breaker in the second switchboard electrically connects to a fourth cross tie that electrically connects to the second cord of the second set of the dual corded electrical loads.

The reserve electrical power distribution platform of a SRDDS can include a third switchboard cabinet with two or more circuit breakers. A fifth circuit breaker in the third switchboard cabinet electrically connects to the first cross tie that electrically connects to the first cord of the first set of the dual corded electrical loads. The fifth circuit breaker also electrically connects to the second cross tie that electrically connects to the second cord of the first set of the dual corded electrical loads. A sixth circuit breaker in the third switchboard cabinet electrically connects to the third cross tie that electrically connects to the first cord of the second set of the dual corded electrical loads. The sixth circuit breaker electrically connects to the fourth cross tie that electrically connects to the second cord of the second set of the dual corded electrical loads. In an example, each cross tie connects to one of the cords of the dual corded electrical loads.

The first cross tie and the second cross tie of a SRDDS can be electrically coupled to each other to form a first pair of cross ties and switch together such that the first set of the dual corded electrical loads is configured to receive AC electrical power from both cords either from 1) the first electrical power distribution platform, or 2) the reserve electrical power distribution platform. Likewise, the third cross tie and the fourth cross tie are electrically coupled to each other to form a second pair of cross ties and switch together such that the second set of the dual corded electrical loads is configured to receive AC electrical power from both cords either from 1) the second electrical power distribution platform, or 2) the reserve electrical power distribution platform.

In a SRDDS, the static UPS units of the first power distribution platform and the static UPS units of the reserve power distribution platform can connect to the respective critical switchboard cabinets of the first power distribution platform and the reserve power distribution platform via circuit breakers. The critical switchboard cabinets of the first power distribution platform and the reserve power distribution platform can be coupled through circuit breakers to the first set of dual corded electrical loads that are downstream of the first pair of cross ties to supply conditioned continuous AC power to the first set of the dual corded electrical loads. The dual corded electrical loads can be critical electrical loads.

An exemplary computing type system for implementing the design includes a general-purpose computing device in the form of a desktop or laptop computer, a tablet, a programmable logic controller or other programmable computing device. Any application and other scripted code components may be stored on a non-transitory computing machine readable medium which, when executed on the computing device causes the computing device to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

Some portions of the detailed descriptions which follow are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

Figure 9:
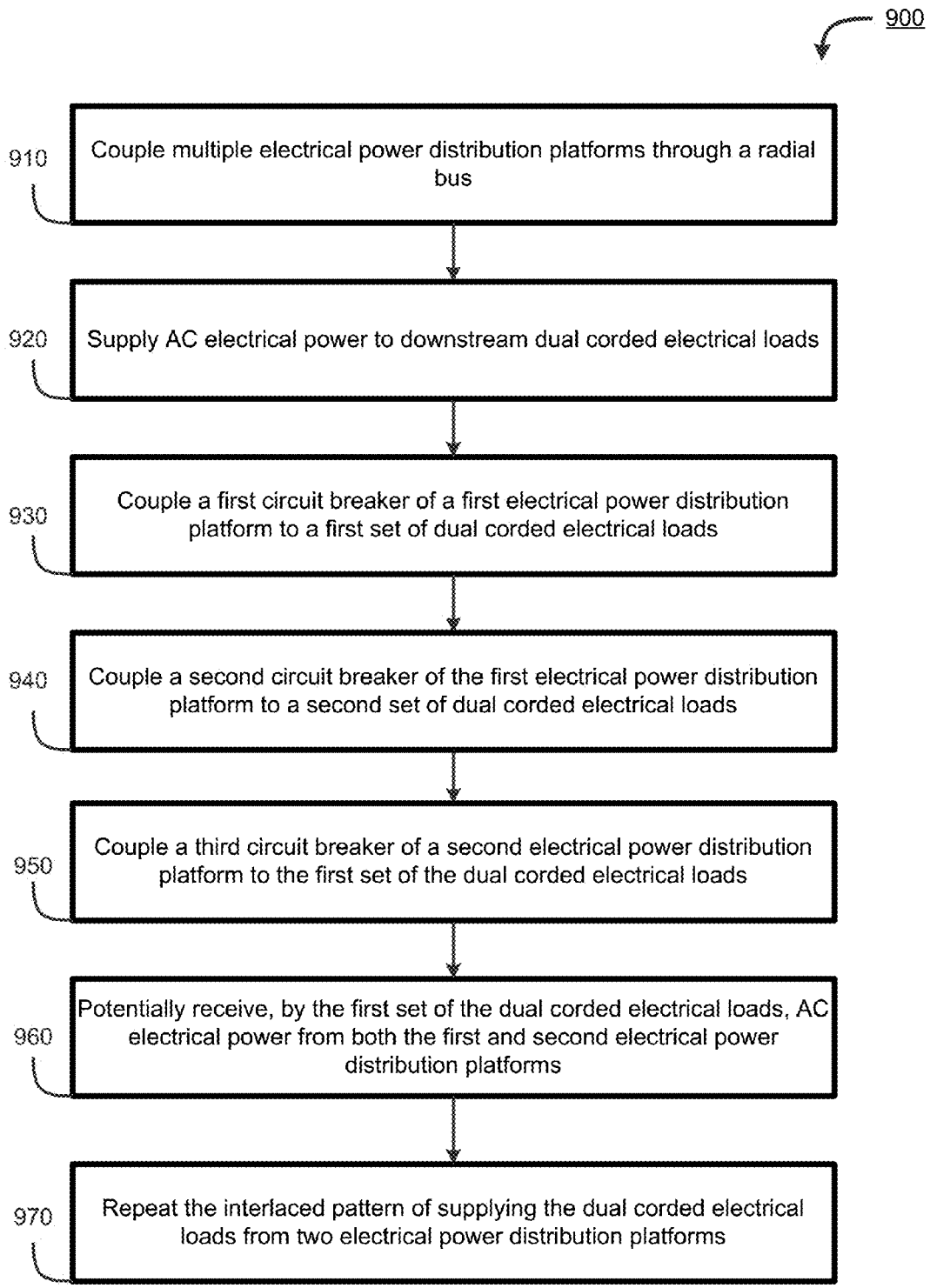
FIG. 9 illustrates a flow graph of an example method of operating a radial bus Shared Resource Distributed electrical power Distribution System (SRDDS).

FIG. 9 illustrates a flow graph of an example method of operating and radial bus Shared Resource Distributed electrical power Distribution System (SRDDS). The method 900 can be used for operating an example radial bus SRDDS 500 or 600 of FIG. 5 or 6. Multiple electrical power distribution platforms are coupled to each other through a radial electrical power bus (910). As shown in FIGS. 5 and 6, the radial bus SRDDS 500 or 600 includes four electrical power distribution platforms which are power distribution platforms 510 or 610 (Platform-A), 520 or 620 (Platform-B), 530 or 630 (Platform-C), and 540 or 640 (Platform-D). The critical switchboard cabinets 102 of the four platforms are coupled through radial bus segments 316, 326, 518, 522, 524, 516, 512, and 520 and via four pairs of cross ties 150 to each other in diagram 500. Likewise, the critical switchboard cabinets 102 of the four platforms are coupled through radial bus segments 316, 326, 618, 622, 624, 616, 612, and 620 and via four pairs of cross ties 150 to each other in diagram 600.

Power is directed from electrical power distribution platforms to dual corded electrical loads (920). As shown in diagrams 500 and 600, AC electrical power is directed from critical switchboard cabinets 102 of the electrical power distribution platforms the pairs of cross ties 150 and from the pairs of cross ties to critical electrical connections 140 and 145. As discussed, dual corded electrical loads have two separate cords for receiving AC electrical power from two separate AC power sources. The first cord of the dual corded critical loads are coupled to one critical electrical connection (e.g., 140) and the second cord of the dual corded critical loads are coupled to another critical electrical connection (e.g., 145) such that each critical electrical load is configured to receive AC electrical power from two electrical cords.

A first circuit breaker in the critical switchboard cabinet of a first electrical power distribution platform is coupled through a pair of cross ties and a critical electrical connection to a first set of dual corded electrical loads (930). For example, the first circuit breaker, e.g., circuit breaker 109 shown FIG. 1, in the critical switchboard cabinet 102 of the electrical power distribution platform 510 or 610 (Platform-A) in diagrams 500 or 600 is coupled through the electrical connection 326 to a pair of cross ties 150 and then through the pair of cross ties 150 to electrical connection 140. Then one of the electrical cords of the first set of dual corded electrical loads is coupled to the electrical connection 140.

A second circuit breaker in the critical switchboard cabinet of the first electrical power distribution platform is coupled through a pair of cross ties and a critical electrical connection to a second set of dual corded electrical loads (940). For example, the second circuit breaker, e.g., circuit breaker 111 shown FIG. 1, in the critical switchboard cabinet 102 of the electrical power distribution platform 510 or 610 (Platform-A) in diagrams 500 or 600 is coupled through the electrical connection 514 or 614 to a pair of cross ties 150 and then through the pair of cross ties 150 to electrical connection 145. Then one of the electrical cords of the second set of dual corded electrical loads is coupled to the electrical connection 145.

A third circuit breaker in the critical switchboard cabinet of the second electrical power distribution platform is coupled through a pair of cross ties and a critical electrical connection to a second set of dual corded electrical loads (950). For example, the third circuit breaker, e.g., circuit breaker 109 shown FIG. 1, in the critical switchboard cabinet 102 of the electrical power distribution platform 520 or 620 (Platform-B) in diagrams 500 or 600 is coupled through the electrical connection 316 to a pair of cross ties 150 and then through the pair of cross ties 150 to electrical connection 145. Then the second electrical cords of the first set of dual corded electrical loads is coupled to the electrical connection 145.

The first set of dual corded electrical loads potentially receives AC electrical power from both the first electrical power distribution platform and the second electrical power distribution platform (960). For example in diagrams 500 or 600, as described above, the first cord of the first set of dual corded electrical loads is coupled through the critical electrical connection 140 and electrical connection 326 to electrical power distribution platform 510 or 610 (Platform-A) and as well the second cord of the first set of dual corded electrical loads is coupled through the critical electrical connection 145 and electrical connection 316 to electrical power distribution platform 520 or 620 (Platform-B).

The interlaced pattern of supplying the dual corded electrical loads from two electrical power distribution platforms is repeated (970). For example in diagrams 500 or 600, the first cord of the second set of dual corded electrical loads is coupled through the critical electrical connection 140 and electrical connection 516 or 616 to electrical power distribution platform 530 or 630 (Platform-C) and as well the second cord of the second set of dual corded electrical loads is coupled through the critical electrical connection 145 and electrical connection 514 or 614 to electrical power distribution platform 510 or 610 (Platform-A). As shown in Diagrams 500 or 600 each set of dual corded electrical loads can be coupled to a pair of cross ties, each coupled to two critical electrical connections 140 and 145. Each set of the dual corded electrical loads from one cord are coupled to the critical electrical connection 140 and from the other cord to the critical electrical connection 145 and potentially receive AC electrical power from two separated AC power sources that are coupled upstream to the pair of cross ties 150.

In one embodiment, as shown in FIG. 5 or 6, one electrical power distribution platform, e.g., electrical power distribution platform 510 or 610 can be coupled to three pairs of cross ties and potentially provide AC electrical power to three sets of dual corded electrical loads. In the same embodiment, one electrical power distribution platform, e.g., electrical power distribution platform 520 or 620 can be coupled to only one pair of cross ties and potentially provide AC electrical power to only one set of dual corded electrical loads while two other electrical power distribution platforms, e.g., electrical power distribution platform 530 and 540 or 630 and 640 can be coupled to two pairs of cross ties and potentially provide AC electrical power to two sets of dual corded electrical loads. In another embodiment, each electrical power distribution platform can be coupled to two pairs of cross ties and potentially provide AC electrical power to two sets of dual corded electrical loads.

The radial bus SRDDS weaves the sets of electrical loads to receive AC electrical power from different possible combinations of power distribution platforms, the different possible combinations of electrical power distribution platforms are alternated between the sets of electrical loads.

Also, the sets of critical electrical loads and the sets of essential electrical loads can weave among different possible combinations of pairs of electrical power distribution platforms to receive AC electrical power from different possible combinations of pairs of electrical power distribution platforms.

In one embodiment of a radial bus SRDDS having four electrical power distribution platforms similar to diagrams 500 or 600, there can be more than four sets of sets of dual corded electrical loads (e.g., 6) such that each set of dual corded electrical loads is potentially provided AC electrical power by two separate electrical power distribution platforms.

Figure 10:
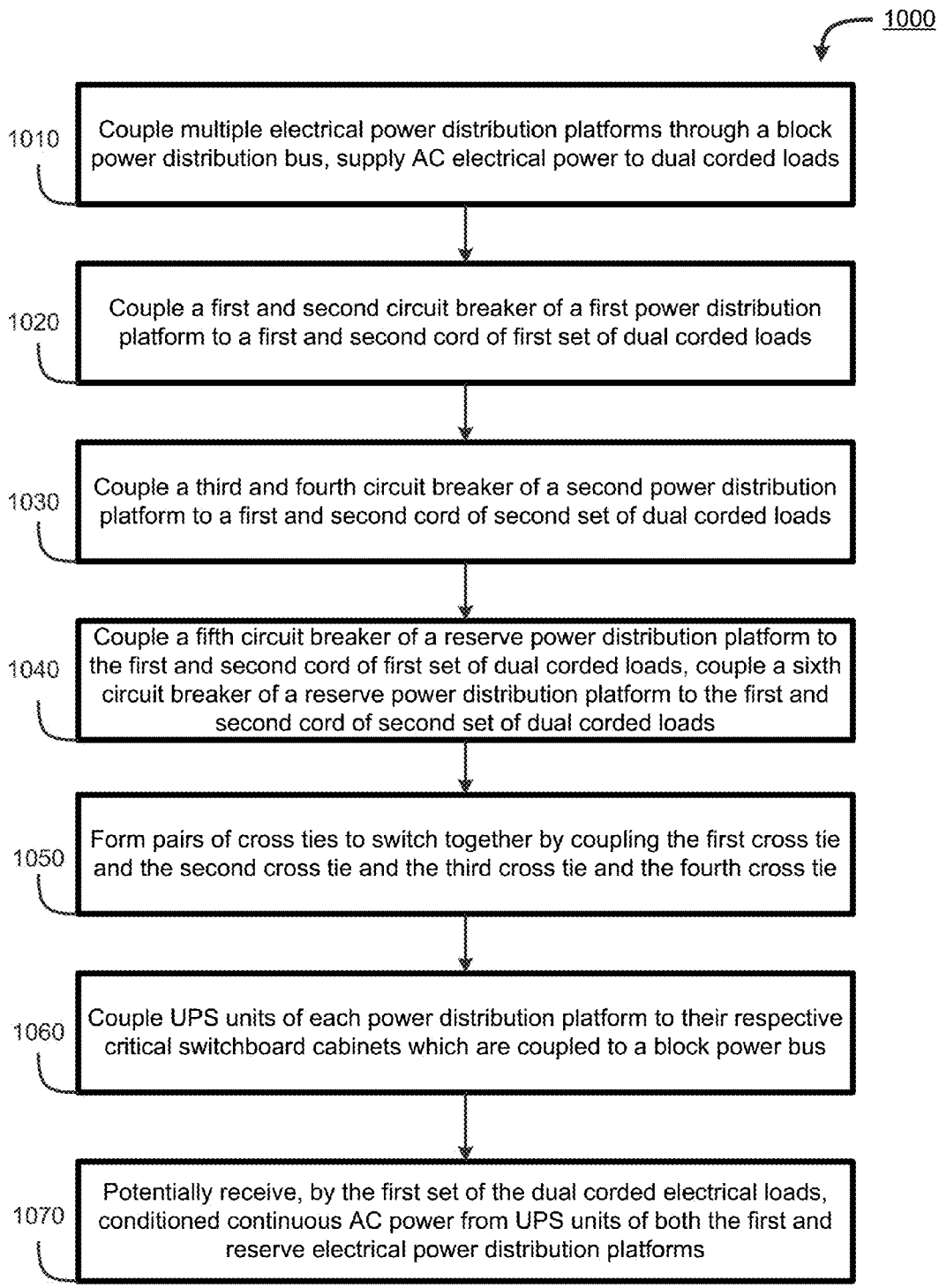
FIG. 10 illustrates a flow graph of an example method of operating and block redundant power distribution platforms.

FIG. 10 illustrates a flow graph of an example method of operating and block redundant power distribution platforms. The method 1000 can be used for operating an example block redundant power distribution platform 800 of FIG. 8. Multiple electrical power distribution platforms are coupled to each other through a block power distribution bus and AC electrical power is directed from electrical power distribution platforms to dual corded electrical loads (1010). As shown in FIG. 8, the dual corded dual STS block redundant arrangement 800 includes four electrical power distribution platforms which are power distribution platforms 810 (Platform-A), 820 or (Platform-B), 830 (Platform-C), and 890 (Platform-R). The critical switchboard cabinets 102 of the power distribution platform 810 and power distribution platform 890 are coupled through radial bus segments 812, 814, and 816 to a pair of static transfer switches (STS) 880. Likewise, the critical switchboard cabinets 102 of the power distribution platform 820 and power distribution platform 890 are coupled through radial bus segments 822, 824, and 826 to a pair of static transfer switches (STS) 880. Also, the critical switchboard cabinets 102 of the power distribution platform 830 and power distribution platform 890 are coupled through radial bus segments 832, 834, and 836 to a pair of static transfer switches (STS) 880. Each static transfer switch of the pair of static transfer switches 880 is coupled to a separate critical load connection 140 or 145.

A first circuit breaker in the critical switchboard cabinet of a first electrical power distribution platform is coupled through a first STS of a pair of STS and a critical electrical connection 140 to a first cord of a first set of dual corded electrical loads, and a second circuit breaker in the critical switchboard cabinet of the first electrical power distribution platform is coupled through a second STS of a pair of STS and a critical electrical connection 145 to a second cord of the first set of dual corded electrical loads (1020). For example, the first circuit breaker, e.g., circuit breaker 109 shown FIG. 1, in the critical switchboard cabinet 102 of the electrical power distribution platform 810 (Platform-A) in diagrams 800 is coupled through the electrical connection 812 to an STS in the pair of STS 880 and then through the STS to the electrical connection 140. Then the first set of dual corded electrical loads is coupled to the electrical connection 140 through their first cord. Likewise, the second circuit breaker, e.g., circuit breaker 111 shown FIG. 1, in the critical switchboard cabinet 102 of the electrical power distribution platform 810 (Platform-A) in diagrams 800 is coupled through the electrical connection 814 to an STS in the pair of STS 880 and then through the STS to the electrical connection 145. Then the first set of dual corded electrical loads is coupled to the electrical connection 145 through their second cord.

A third circuit breaker in the critical switchboard cabinet of a second electrical power distribution platform is coupled through a first STS of a pair of STS and a critical electrical connection 140 to the first cord of a second set of dual corded electrical loads, and a fourth circuit breaker in the critical switchboard cabinet of the second electrical power distribution platform is coupled through a second STS of a pair of STS and a critical electrical connection 145 to the second cord of the second set of dual corded electrical loads (1030). For example, the first circuit breaker, e.g., circuit breaker 109 shown FIG. 1, in the critical switchboard cabinet 102 of the electrical power distribution platform 820 (Platform-B) in diagrams 800 is coupled through the electrical connection 822 to an STS in the pair of STS 880 and then through the STS to the electrical connection 140. Then the second set of dual corded electrical loads is coupled to the electrical connection 140 through their first cord. Likewise, the second circuit breaker, e.g., circuit breaker 111 shown FIG. 1, in the critical switchboard cabinet 102 of the electrical power distribution platform 820 (Platform-B) in diagrams 800 is coupled through the electrical connection 824 to an STS in the pair of STS 880 and then through the STS to the electrical connection 145. Then the second set of dual corded electrical loads is coupled to the electrical connection 145 through their second cord.

A fifth circuit breaker in the critical switchboard cabinet of a reserve electrical power distribution platform is coupled through a first STS of a first pair of STS and a critical electrical connection 140 to the first cord of the first set of dual corded electrical loads and through a second STS of the first pair of STS and a critical electrical connection 145 to the second cord of the first set of dual corded electrical loads. Likewise, a sixth circuit breaker in the critical switchboard cabinet of the reserve electrical power distribution platform is coupled through a first STS of a second pair of STS and a critical electrical connection 140 to the first cord of the second set of dual corded electrical loads and through a second STS of the second pair of STS and a critical electrical connection 145 to the second cord of the second set of dual corded electrical loads (1040). For example, the first circuit breaker, e.g., circuit breaker 109 shown FIG. 1, in the critical switchboard cabinet 102 of the electrical power distribution platform 890 (Platform-R) in diagrams 800 is coupled through the electrical connection 816 to both STS in the pair of STS 880 and then through both STS to the electrical connection 140 and 145. Then the first set of dual corded electrical loads are coupled to the electrical connections 140 and 145 through their first and second cords. Likewise, the second circuit breaker, e.g., circuit breaker 111 shown FIG. 1, in the critical switchboard cabinet 102 of the electrical power distribution platform 890 (Platform-R) in diagrams 800 is coupled again through the electrical connection 826 to both STS in the pair of STS 880 and then through both STS to the electrical connection 140 and 145. Then the second set of dual corded electrical loads are coupled to the electrical connection 140 and 145 through their first and second cords. Thus, the two cords of the first set of dual corded critical electrical loads that are coupled to both critical electrical connections 140 and 145 can nominally receive AC electrical power from electrical power distribution platform 810 (Platform-A) and can potentially receive power from the electrical power distribution platform 890 (Platform-R) when the electrical power distribution platform 810 (Platform-A) fails and the pair of STS 880 automatically switched from the electrical power distribution platform 810 (Platform-A) to the electrical power distribution platform 890 (Platform-R).

Pairs of cross ties are formed to switch together. The first cross tie and the second cross tie are paired together to form the first pair of cross ties and the second cross tie and the third cross tie are paired together to form the second pair of cross ties (1050). As an example, the pair of cross ties are the pair of STS 880 in FIG. 8 which automatically switch. In another example the pair of cross ties 150 in FIG. 5 can be used which can manually switch.

The UPS units of each power distribution platform are coupled to their respective critical switchboard cabinets which are then coupled to a block power bus (1060). As shown in FIG. 1, UPS units 110 and 112 can connect through circuit breakers 101, 103, and 105 to the critical switchboard cabinet 102. The UPS units supply conditioned continuous AC electrical power.

The first set of dual corded electrical loads receives conditioned continuous AC power from the UPS units of the first electrical power distribution platform and potentially receives AC power from the UPS units of the reserve electrical power distribution platform (1070). For example in diagrams 800, as described above, the first cord of the first set of dual corded electrical loads is coupled through the critical electrical connection 140, an STS, and the electrical connection 812 to electrical power distribution platform 810 (Platform-A) and as well the second cord of the first set of dual corded electrical loads is coupled through the critical electrical connection 145, another STS, and the electrical connection 814 to electrical power distribution platform 810 (Platform-A). Additionally, the both STSs are coupled through the electrical connection 816 to electrical power distribution platform 890 (Platform-R). Therefore the first set of dual corded electrical loads normally receives conditioned continuous AC power from the UPS units of electrical power distribution platform 810 (Platform-A) and in the event electrical power distribution platform 810 fails or is serviced the pair of STS 880 can switch and the first set of dual corded electrical loads can receive conditioned continuous AC power from the UPS units of electrical power distribution platform 890 (Platform-R).

In the block redundant approach three primary electrical power distribution platforms supply power to a first cord of the two cords of the dual corded electrical loads that can receive AC electrical power typically from two cords from two separate AC power sources. Nominally the dual corded electrical loads from a second cord are connected to a reserve electrical power distribution platform that provides AC electrical power as the second AC electrical source.

The blocking approach typically has static transfer switches (STS) which electronically transfer from one source of power to another source of power in contrast to the manual crosstie which has to be manually flipped from one source of a AC power to another source of AC power.

Therefore, static transfer switches (STS) automatically and electronically transfer from one source of power to another source of power.

Figure 11:
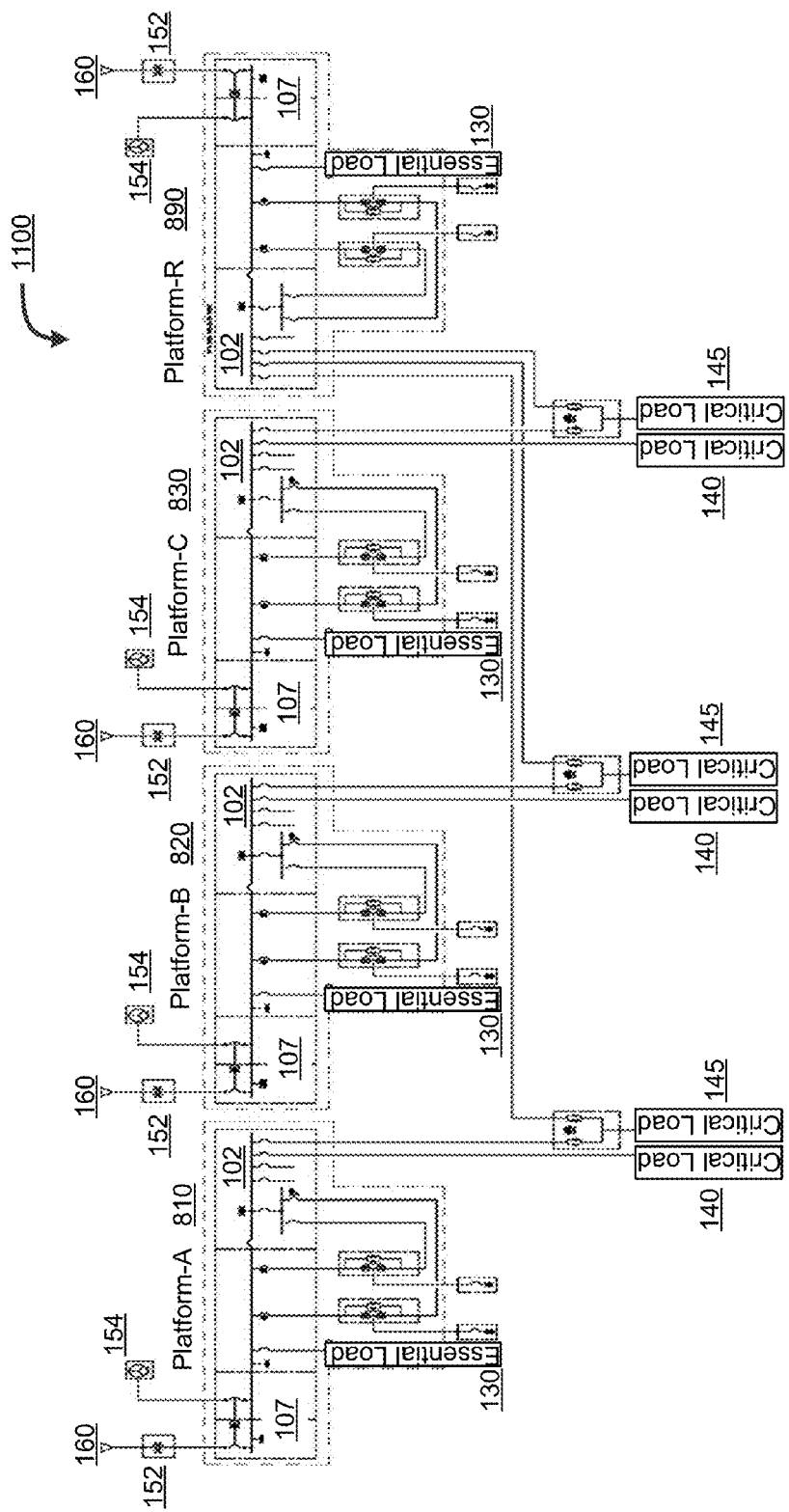
FIG. 11 is a single line diagram showing four power distribution platforms in a dual corded single STS block redundant arrangement.

FIG. 11 is a single line diagram showing four power distribution platforms in a dual corded single STS block redundant arrangement. The diagram 1100 of FIG. 11 includes the same components of FIG. 8 except that there is only one STS for each set of dual corded electrical loads. The electrical loads are dual corded and in normal operation both cords are coupled to a single electrical power distribution platform of 810, 820, or 830. The STS that is coupled to each set of the dual corded electrical loads, is also coupled to a reserve electrical power distribution platform 890 which in the event of failure the STS switches and the reserve power distribution platforms supplies conditioned continuous AC power from one of the cords.

Figure 12:
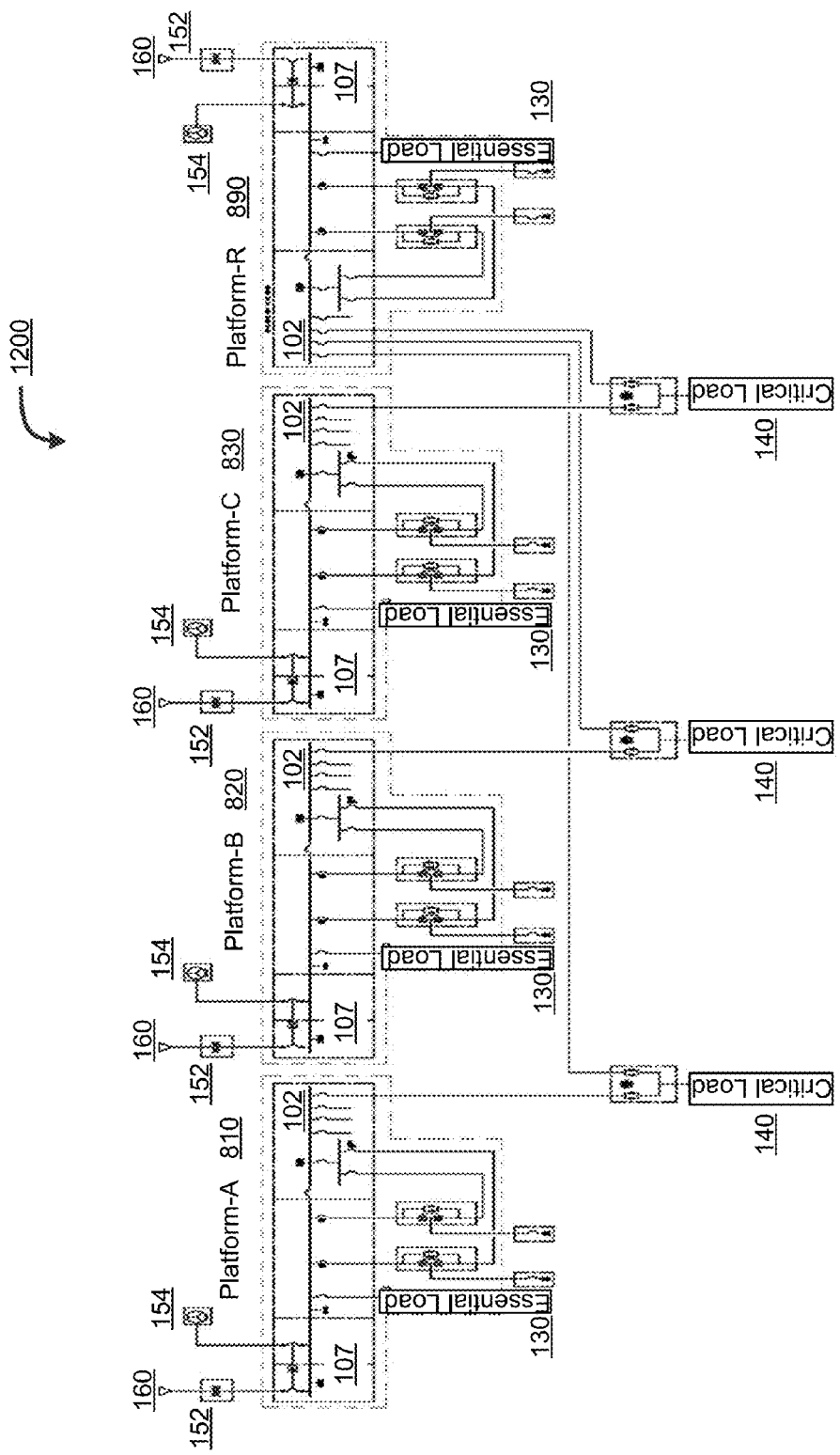
FIG. 12 is a single line diagram showing four power distribution platforms in a single corded single STS block redundant arrangement.

FIG. 12 is a single line diagram showing four power distribution platforms in a single corded single STS block redundant arrangement. The diagram 1200 of FIG. 12 includes the same components of FIG. 8 except that there is only one STS for each set electric loads and the electric load are not dual corded. Each set of electric loads is normally coupled to only one of the electrical power distribution platform 810, 820, or 830 and in the event of failure the STS switches and electrical power distribution platform 890 supplies AC electrical power.

The datacenter industry is beginning to realize the benefits of the early industrial revolution. Standardized modular power center designs provide some of the same benefits to design and construction personnel. Instead of hand-building custom electrical systems for each datacenter, the modular approach allows for greater deployment speed, improved quality and lower costs, all achieved by using factory-based labor. The use of modules also relieves labor stacking on the job site, while reducing the overall cost of the work by a significant amount. Cost savings can be attained using factory labor. The circuit breakers may not be isolation circuit breakers. Modularizing datacenter components permits control over cost, quality, and schedule.

In one embodiment, the software used to facilitate the algorithms discussed herein can be embodied onto a non-transitory machine-readable medium. A machine-readable medium includes any mechanism that stores information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the design have been shown the design is not to be limited to these embodiments. For example, most functions performed by electronic hardware components may be duplicated by software emulation. Thus, a software program written to accomplish those same functions may emulate the functionality of the hardware components in input-output circuitry. The type and/or number of cabinet may vary, etc. The design is to be understood as not limited by the specific embodiments described herein, but only by scope of the appended claims.

What is claimed is:

1. A radial bus Shared Resource Distributed electrical power Distribution System (SRDDS), comprising:
multiple electrical power distribution platforms including a first electrical power distribution platform and a second electrical power distribution platform;
a radial power distribution bus to distribute AC electrical power to downstream electrical loads, where the multiple electrical power distribution platforms are coupled to the radial power distribution bus in an interlaced fashion via two or more cross ties to supply AC electrical power to the downstream electrical loads, and where the downstream electrical loads are dual corded and are configured to nominally receive AC electrical power from two separate AC electrical power distribution platforms;
where the first electrical power distribution platform includes a first switchboard cabinet with two or more circuit breakers, where the first electrical power distribution platform, via a first circuit breaker in the first switchboard cabinet, electrically connects to a first cross tie that then electrically connects to a first set of the dual corded electrical loads, and where the first electrical power distribution platform, via a second circuit breaker in the first switchboard cabinet, electrically connects to a second cross tie that then electrically connects to a second set of the dual corded electrical loads;
where the second electrical power distribution platform includes a second switchboard cabinet with two or more circuit breakers, where the second electrical power distribution platform, via a third circuit breaker in the second switchboard cabinet, electrically connects to a third cross tie that then electrically connects to the first set of the dual corded electrical loads, and where the second electrical power distribution platform, via a fourth circuit breaker in the second switchboard cabinet electrically connects to a fourth cross tie that then electrically connects to a third set of the dual corded electrical loads.

2. The radial bus SRDDS of claim 1, further comprising: a third electrical power distribution platform that includes a third switchboard cabinet with two or more circuit breakers, where the third electrical power distribution platform, via a fifth circuit breaker in the third switchboard cabinet, electrically connects to a fifth cross tie that then electrically connects to the second set of the dual corded electrical loads, and where the third electrical power distribution platform via, a sixth circuit breaker in the third switchboard cabinet electrically connects to a sixth cross tie that then electrically connects to the third set of the dual corded electrical loads, wherein further repeating an interlaced pattern of supplying other sets of dual corded electrical loads from two electrical power distribution platforms.

3. The radial bus SRDDS of claim 2, wherein the first cross tie and the third cross tie are configured to connect to each other via their own manually operated input/output circuit breakers to form a first pair of cross ties, where the first pair of cross ties is configured to receive AC electrical power from the first and second electrical power distribution platforms, where the first set of the dual corded electrical loads is configured to receive AC electrical power from the first electrical power distribution platform which connects, via the first cross tie of the first pair of cross ties, to a first electrical cord of the first set of the dual corded electrical loads and is also configured to receive AC electrical power from the second electrical power distribution platform which connects, via the third cross tie of the first pair of cross ties, to a second electrical cord of the first set of the dual corded electrical loads;

wherein the second cross tie and the fifth cross tie are configured to connect to each other via their own manually operated input/output circuit breakers to form a second pair of cross ties and the fourth cross tie and the sixth cross tie are configured to connect to each other via their own manually operated input/output circuit breakers to form a third pair of cross ties, where the manually operated input/output circuit breakers in the pair of cross ties are nominally open.

4. The radial bus SRDDS of claim 3, wherein each electrical power distribution platform has 1) one or more static Uninterruptable Power Supplies (UPS) units, 2) one or more critical switchboard cabinets to supply conditioned continuous AC power to respective critical electrical loads, 3) one or more essential switchboard cabinets to supply AC electrical power to respective essential electrical loads, and
4) one or more main switchboard cabinets to receive AC electrical power from one or more sources of AC electrical power;
  wherein the static UPS units of the first power distribution platform and the static UPS units of the second power distribution platform connect to the respective critical switchboard cabinets of the first power distribution platform and the second power distribution platform via circuit breakers, where the critical switchboard cabinets of the first power distribution platform and the second power distribution platform are coupled through circuit breaker to a first set of critical electrical loads that are downstream of the first pair of cross ties to supply conditioned continuous AC power to the first set of critical electrical loads.

5. The radial bus SRDDS of claim 4, wherein each set of the static UPS units of each electrical power distribution platform has its own programmable logic controller, wherein the programmable logic controllers of the UPS units of the first and the second power distribution platforms electrically synchronize a voltage and a frequency being supplied as conditioned continuous AC power out of the UPS units of both the first and the second power distribution platforms, where to provide synchronized conditioned continuous AC power to both electrical cords going to the first set of critical electrical loads, where the first set of the dual corded electrical loads actually are poly corded electrical loads that have three or more electrical cords.

6. The radial bus SRDDS of claim 4, further comprising:
a utility transformer electrically coupled between an AC utility grid and a main switchboard cabinet of the first power distribution platform, where the utility transformer is configured to have an impedance of at least 5% and up to 9% to eliminate a need for an AIC line reactor to limit a maximum total fault current in the first power distribution platform, where the maximum total fault current occurring before any over current protection actuating.

7. The radial bus SRDDS of claim 3, further comprising:
a seventh cross tie and an eighth cross tie that are configured to connect to each other via their own manually operated input/output circuit breakers to form a fourth pair of cross ties, where the fourth pair of cross ties is installed initially along with the first through sixth cross ties in a mission critical facility, where the seventh and the eighth cross ties are not electrically coupled to the respective power distribution platforms;
a first diesel generator is initially installed and electrically connected to a first main switchboard cabinet of the first power distribution platform, where a second diesel generator is configured to be installed and to be electrically connected to a second main switchboard cabinet of a fourth power distribution platform after the initial installation of the mission critical facility;
wherein one or more additional power distribution platforms and one or more diesel generators are configured to be installed and to be electrically connected into the radial bus SRDDS after the initial installation of the mission critical facility, where installation of the additional one or more electrical power distribution platforms are configured to occur into the already existing fourth pair of cross ties without removing AC electrical power from critical electrical loads of the mission critical facility, where a predefined number of expected pairs of cross ties are installed at the initial installation of the mission critical facility based on an anticipated maximum electrical capacity of the mission critical facility in electrical megawatts.

8. The radial bus SRDDS of claim 1, wherein the first cross tie and the third cross tie electrically connect via a pair of manual input/output circuit breakers to form a first pair of cross ties and to electrically connect the first pair of cross ties to the first set of dual corded electrical loads to maintain AC electrical power supplied to the first set of dual corded electrical loads in moments of service or when maintenance is performed on one of upstream power distribution platforms of 1) the first electrical power distribution platform, or 2) the second electrical power distribution platform;
where the first pair of cross ties connects to the first set of electrical loads, each load of the first set of electrical loads having dual AC electrical power cords, each electrical power cord is configured to receive AC electrical power from one of the two power distribution platforms, and when closing the pair of manual input/output circuit breakers, AC electrical power from a single electrical power distribution platform is supplied to both electrical power cords going into each load of the first set of dual cord electrical loads.

9. The radial bus SRDDS of claim 1, wherein each cross tie has a first input circuit breaker connecting to a respective electrical power distribution platform and a second input/output circuit breaker connecting and pairing to another cross tie, where the second input/output circuit breakers of the cross ties connecting between a pairs of cross ties are manually operated, where the first input circuit breaker of each cross tie allows a power distribution platform coupled to the first input circuit breaker to be electrically opened and to be de-energized for maintenance or service;
where the second input/output circuit breaker of each cross tie is nominally open and is configured to be manually operated and to be manually closed, allowing dual corded critical electrical loads connected downstream of a pair of cross ties to potentially receive AC electrical power to both of dual cords of a set of the dual corded electrical loads downstream from the pair of cross ties;
where the radial bus SRDDS weaves the sets of electrical loads to receive AC electrical power from different possible combinations of power distribution platforms, the different possible combinations of electrical power distribution platforms are alternated between the sets of electrical loads.

10. A Shared Resource Distributed electrical power Distribution System (SRDDS), comprising:
multiple electrical power distribution platforms including a first electrical power distribution platform, a second electrical power distribution platform, and a reserve electrical power distribution platform;
a block power distribution bus to distribute AC electrical power to downstream electrical loads, where the downstream electrical loads are dual corded, where the dual corded electrical loads each having a first cord and a second cord and configured to be powered by two separate AC electrical power sources, and where the multiple electrical power distribution platforms are coupled to the block power distribution bus via two or more cross ties to supply AC electrical power to the downstream electrical loads;
where the first electrical power distribution platform includes a first switchboard cabinet with two or more circuit breakers, where a first circuit breaker in the first switchboard cabinet electrically connects to a first cross tie that electrically connects to the first cord of a first set of the dual corded electrical loads, and where a second circuit breaker in the first switchboard cabinet electrically connects to a second cross tie that electrically connects to the second cord of the first set of the dual corded electrical loads;

where the second electrical power distribution platform includes a second switchboard cabinet with two or more circuit breakers, where a third circuit breaker in the second switchboard cabinet electrically connects to a third cross tie that electrically connects the first cord of a second set of the dual corded electrical loads, and where a fourth circuit breaker in the second switchboard electrically connects to a fourth cross tie that electrically connects to the second cord of the second set of the dual corded electrical loads;

where the reserve electrical power distribution platform includes a third switchboard cabinet with two or more circuit breakers, where a fifth circuit breaker in the third switchboard cabinet electrically connects to the first cross tie that electrically connects to the first cord of the first set of the dual corded electrical loads, and where the fifth circuit breaker electrically connects to the second cross tie that electrically connects to the second cord of the first set of the dual corded electrical loads;

where a sixth circuit breaker in the third switchboard cabinet electrically connects to the third cross tie that electrically connects to the first cord of the second set of the dual corded electrical loads, and where the sixth circuit breaker electrically connects to the fourth cross tie that electrically connects to the second cord of the second set of the dual corded electrical loads;

where the first cross tie and the second cross tie are electrically coupled to each other to form a first pair of cross ties and switch together such that the first set of the dual corded electrical loads is configured to receive AC electrical power from both cords either from 1) the first electrical power distribution platform, or 2) the reserve electrical power distribution platform;

where the third cross tie and the fourth cross tie are electrically coupled to each other to form a second pair of cross ties and switch together such that the second set of the dual corded electrical loads is configured to receive AC electrical power from both cords either from 1) the second electrical power distribution platform, or 2) the reserve electrical power distribution platform;

wherein each electrical power distribution platform has 1) one or more static UPS units, 2) one or more critical switchboard cabinets to supply conditioned continuous AC power to respective critical electrical loads, and 3) one or more essential switchboard cabinets to supply AC electrical power to respective essential electrical loads; and wherein the static UPS units of the first power distribution platform and the static UPS units of the reserve power distribution platform connect to the respective critical switchboard cabinets of the first power distribution platform and the reserve power distribution platform via circuit breakers, where the critical switchboard cabinets of the first power distribution platform and the reserve power distribution platform are coupled through circuit breakers to the first set of dual corded electrical loads that are downstream of the first pair of cross ties to supply conditioned continuous AC power to the first set of the dual corded electrical loads.

11. A method of operating a radial bus Shared Resource Distributed electrical power Distribution System (SRDDS), comprising:

coupling multiple electrical power distribution platforms through a radial power distribution bus in an interlaced fashion;

supplying AC electrical power to downstream dual corded electrical loads;

coupling a first circuit breaker of a first switchboard cabinet of a first electrical power distribution platform through a first cross tie to a first set of the dual corded electrical loads;

coupling a second circuit breaker of the first switchboard cabinet of the first electrical power distribution platform through a second cross tie to a second set of the dual corded electrical loads;

coupling a third circuit breaker of a second switchboard cabinet of a second electrical power distribution platform through a third cross tie to the first set of the dual corded electrical loads;

coupling a fourth circuit breaker of the second switchboard cabinet of the second electrical power distribution platform through a fourth cross tie to a third set of the dual corded electrical loads;

potentially receiving, by the first set of the dual corded electrical loads, AC electrical power from both the first electrical power distribution platform and the second electrical power distribution platform.

12. The method claim 11, further comprising:

coupling a fifth circuit breaker of a third switchboard cabinet of a third electrical power distribution platform through a fifth cross tie to the second set of the dual corded electrical loads;

potentially receiving, by the second set of the dual corded electrical loads, AC electrical power from both the first electrical power distribution platform and the third electrical power distribution platform;

coupling a sixth circuit breaker of the third switchboard cabinet of the third electrical power distribution platform through a sixth cross tie to the third set of the dual corded electrical loads;

potentially receiving, by the third set of the dual corded electrical loads, AC electrical power from both the second electrical power distribution platform and the third electrical power distribution platform;

repeating an interlaced pattern of supplying the dual corded electrical loads from two electrical power distribution platforms.

13. The method claim 12, further comprising:

forming a first pair of cross ties by connecting the first cross tie and the third cross tie through manually operated input/output circuit breakers;

receiving AC electrical power by the first pair of cross ties from both the first and second electrical power distribution platforms;

directing AC electrical power from the first pair of cross ties to the first set of the dual corded electrical loads through 1) directing AC electrical power from the first electrical power distribution platform to a first cord of the first set of the dual corded electrical loads, and 2) directing AC electrical power from the second electrical power distribution platform to a second cord of the first set of the dual corded electrical loads;

switching manually operated input/output circuit breakers of the first pair of cross ties and 1) receiving AC electrical power from the second electrical power distribution platform through the second cord of the first set of the dual corded electrical loads, or 2) receiving AC electrical power from the first electrical power distribution platform through the first cord of the first set of the dual corded electrical loads;

forming a second pair of cross ties by connecting the second cross tie and the fifth cross tie through manually operated input/output circuit breakers and forming a third pair of cross ties by connecting the fourth cross tie and the sixth cross tie through manually operated input/output circuit breakers.

14. The method claim 13, further comprising:
connecting static UPS units of the first power distribution platform and the second power distribution platform to respective critical load switchboard cabinets of the first power distribution platform and the second power distribution platform;
connecting the critical switchboard cabinets of the first power distribution platform and the second power distribution platform to a first set of critical electrical loads downstream of the first pair of cross ties;
supplying conditioned continuous AC power to the first set of critical electrical loads.

15. The method claim 14, wherein configuring programmable logic controllers of the static UPS units of the first and the second power distribution platforms for synchronizing electrical phase and frequency of the static UPS units of the first and the second power distribution platforms and providing synchronized conditioned continuous AC power to dual cords going to the first set of critical electrical loads.

16. The method claim 14, further comprising:
electrically coupling a utility transformer between an AC utility grid and a main switchboard cabinet of the first power distribution platform;
configuring the utility transformer to have an impedance of at least 5% and up to 9%;
limiting a maximum total fault current in the first power distribution platform.

17. The method claim 13, further comprising:
forming a fourth pair of cross ties by connecting a seventh cross tie and an eighth cross tie through manually operated input/output circuit breakers;
initially installing the fourth pair of cross ties along with the first to sixth cross ties in a mission critical facility without coupling the seventh cross tie and the eighth cross tie to power distribution platforms;
initially installing a first diesel generator and coupling the first diesel generator to a first main switchboard cabinet of the of the first power distribution platform;
installing a second diesel generator and electrically connecting the second diesel generator to a second main switchboard cabinet of a fourth power distribution platform after the initial installation of the mission critical facility;
installing one or more additional power distribution platforms and diesel generators and electrically connecting the additional power distribution platforms through the fourth pair of cross ties into the radial bus SRDDS after the initial installation of the mission critical facility without removing AC electrical power from critical electrical loads of the mission critical facility;
installing a predefined number of expected pairs of cross ties at the initial installation of the mission critical facility based on an anticipated maximum electrical capacity of the mission critical facility.

18. The method claim 11, further comprising:
forming a first pair of cross ties by connecting the first cross tie and the third cross tie through manually operated input/output circuit breakers;
receiving AC electrical power by the first pair of cross ties from both the first and the second electrical power distribution platforms;
switching manually operated input/output circuit breakers of the first pair of cross ties and 1) disconnecting the first electrical power distribution platform and directing AC electrical power from the second electrical power distribution platform, or 2) disconnecting the second electrical power distribution platform and directing AC electrical power from the first electrical power distribution platform, to the first set of the dual corded electrical loads;
performing maintenance and service on the disconnected electrical power distribution platform.

19. The method claim 11, further comprising:
coupling a first input circuit breaker of each cross tie to a respective electrical power distribution platform;
opening the first input circuit breaker of each cross tie and decoupling the cross tie from the respective electrical power distribution platform;
de-energizing the respective electrical power distribution platform for maintenance or service;
coupling a second input/output circuit breaker of each cross tie to the second input/output circuit breaker of a pairing cross tie and creating a pair of cross ties;
manually closing the second input/output circuit breakers between pairing cross ties;
providing AC electrical power to both cords of a set of the dual corded electrical loads downstream from the pair of cross ties;
weaving the sets of electrical loads and receiving AC electrical power from different possible combinations of power distribution platforms, the different possible combinations of electrical power distribution platforms are alternated between the sets of electrical loads.

20. A method of operating a Shared Resource Distributed electrical power Distribution System (SRDDS), comprising:
coupling multiple electrical power distribution platforms through a block power distribution bus;
supplying AC electrical power to downstream dual corded electrical loads, the dual corded electrical loads each having a first cord and a second cord;
coupling a first circuit breaker of a first switchboard cabinet of a first electrical power distribution platform through a first cross tie to the first cord of a first set of the dual corded electrical loads;
coupling a second circuit breaker of the first switchboard cabinet of the first electrical power distribution platform through a second cross tie to the second cord of the first set of the dual corded electrical loads;
coupling a third circuit breaker of a second switchboard cabinet of a second electrical power distribution platform through a third cross tie to the first cord of a second set of the dual corded electrical loads;
coupling a fourth circuit breaker of the second switchboard cabinet of the second electrical power distribution platform through a fourth cross tie to the second cord of the second set of the dual corded electrical loads;
coupling a fifth circuit breaker of a third switchboard cabinet of a reserve electrical power distribution platform through the first cross tie to the first cord of the first set of the dual corded electrical loads and through the second cross tie to the second cord of the first set of the dual corded electrical loads;

coupling a sixth circuit breaker of the third switchboard cabinet of the reserve electrical power distribution platform through the third cross tie to the first cord of the second set of the dual corded electrical loads and through the fourth cross tie to the second cord of the second set of the dual corded electrical loads;

forming pairs of cross ties to switch together by 1) coupling together the first cross tie and the second cross tie to form a first pair of cross ties, and 2) coupling together the third cross tie and the fourth cross tie to form a second pair of cross ties;

coupling static UPS units of the first power distribution platform and the reserve power distribution platform to respective critical load switchboard cabinets of the first power distribution platform and the reserve power distribution platform;

coupling the critical switchboard cabinets of the first power distribution platform and the reserve power distribution platform to the first set of electrical loads downstream of the first pair of cross ties;

supplying conditioned continuous AC power of the UPS units to the first set of electrical loads.

21. A shared resource distributed electrical power distribution system having two or more radial buses, comprising:

three or more electrical power distribution platforms coupled to the radial buses via cross ties, wherein coupling two or more of the cross ties to form a pair of cross ties connecting between at least a first electrical power distribution platform and a second electrical power distribution platform;

at least one critical electrical radial bus to supply conditioned continuous AC electrical power to critical electrical loads;

at least one essential electrical radial bus to supply AC electrical power to essential electrical loads;

where the critical electrical radial bus and the essential electrical radial bus are divided into multiple segments with each segment supplied electrical power from its own pair of cross ties connected between two or more of electrical power distribution platforms, and thus, the critical dual corded electrical loads in the shared resource electrical distribution system are formed into sets of critical dual corded electrical loads, wherein each set of the critical electrical loads is coupled to a shared pair of cross ties and is powered by two separate electrical power distribution platforms, and wherein each set of the essential electrical loads is coupled to a different shared pair of cross ties and is powered by two separate electrical power distribution platforms;

wherein the sets of critical electrical loads and the sets of essential electrical loads are weaved among different possible combinations of pairs of electrical power distribution platforms each coupling to their own pair of cross ties to receive AC electrical power from alternating pairs of electrical power distribution platforms;

one or more static uninterruptable power supply (UPS) units coupled to each electrical power distribution platform and configured to supply conditioned continuous power to the critical electrical loads, wherein each set of the critical electrical loads is coupled through a shared pair of cross ties to the UPS units of two electrical distribution platforms and is configured to receive continuous conditioned power AC electrical power; and at least one control system associated with each pair of cross ties to switch between the pair of electrical distribution platforms coupled to each pair of cross ties and to switch between the source of AC electrical power coupled to electrical loads of each pair of cross ties.

\* \* \* \* \*